United States Patent
Mori

(10) Patent No.: US 9,567,938 B2
(45) Date of Patent: Feb. 14, 2017

(54) CONTROL DEVICE FOR INTERNAL COMBUSTION ENGINE

(75) Inventor: Sachio Mori, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 246 days.

(21) Appl. No.: 14/350,891

(22) PCT Filed: Oct. 11, 2011

(86) PCT No.: PCT/JP2011/073322
§ 371 (c)(1),
(2), (4) Date: Apr. 10, 2014

(87) PCT Pub. No.: WO2013/054391
PCT Pub. Date: Apr. 18, 2013

(65) Prior Publication Data
US 2015/0322881 A1    Nov. 12, 2015

(51) Int. Cl.
*F02D 41/40* (2006.01)
*F02D 41/14* (2006.01)
*F02M 35/10* (2006.01)
*F02M 35/108* (2006.01)
*F02D 13/02* (2006.01)
(Continued)

(52) U.S. Cl.
CPC ............ *F02D 41/40* (2013.01); *F02D 13/0215* (2013.01); *F02D 13/0249* (2013.01); *F02D 13/0253* (2013.01); *F02D 13/0257* (2013.01); *F02D 41/0002* (2013.01); *F02D 41/1443* (2013.01); *F02D 41/1455* (2013.01); *F02D 41/3094* (2013.01); *F02M 35/1085* (2013.01); *F02M 35/10177* (2013.01); *F02D 2041/001* (2013.01);
(Continued)

(58) Field of Classification Search
CPC ...... F02D 41/14; F02D 41/1455; F02D 41/40; F02D 13/02; F02D 13/0215; F02D 13/0253
USPC .......... 123/193.1–193.4, 294, 299, 300, 305; 701/103–105, 108
See application file for complete search history.

(56) References Cited

U.S. PATENT DOCUMENTS 7,908,073 B2 * 3/2011 Takubo ............... F02D 41/0032
123/703
2009/0205613 A1 * 8/2009 Kawakita ................ F02D 37/02
123/406.44
(Continued)

FOREIGN PATENT DOCUMENTS

JP         11-050900 A       2/1999
JP       2000-291436 A      10/2000
(Continued)

*Primary Examiner* — John Kwon
*Assistant Examiner* — Johnny H Hoang
(74) *Attorney, Agent, or Firm* — Sughrue Mion, PLLC

(57) ABSTRACT

A control device for an internal combustion engine includes first and second intake ports (16a, 16b) independent of each other, and first and second fuel injection valves (30a, 30b) provided for the first and second intake ports (16a, 16b), respectively, in each cylinder. Under a situation where an exhaust variable valve mechanism (38) is controlled such that a first exhaust valve (32a) is opened earlier than a second exhaust valve (32b), first and second air-fuel ratios A/F1, A/F2 are respectively obtained in a first half and a second half of an exhaust stroke. When the obtained first air-fuel ratio A/F1 (or the second air-fuel ratio A/F2) is lean, a fuel injection amount in a next cycle by the first or second fuel injection valve (30a, 30b) corresponding to the first air-fuel ratio A/F1 (or the second air-fuel ratio A/F2) that is lean is reduced.

9 Claims, 10 Drawing Sheets

(51) Int. Cl.
*F02D 41/00* (2006.01)
*F02D 41/30* (2006.01)

(52) U.S. Cl.
CPC .................. *Y02T 10/18* (2013.01); *Y02T 10/42* (2013.01); *Y02T 10/44* (2013.01)

(56) References Cited

U.S. PATENT DOCUMENTS

| | | | | |
|---|---|---|---|---|
| 2012/0116651 | A1* | 5/2012 | Miyamoto | F02D 41/30 701/103 |
| 2012/0215423 | A1* | 8/2012 | Sakayanagi | F02B 75/041 701/104 |
| 2012/0271534 | A1* | 10/2012 | Kachi | F02D 41/0235 701/108 |
| 2012/0290192 | A1* | 11/2012 | Okazaki | F02D 41/1454 701/103 |
| 2013/0073181 | A1* | 3/2013 | Mamada | F02D 41/14 701/103 |
| 2013/0138329 | A1* | 5/2013 | Aoki | F02D 41/0085 701/104 |
| 2013/0144510 | A1* | 6/2013 | Iwazaki | F02D 41/0085 701/104 |
| 2013/0184972 | A1* | 7/2013 | Suzuki | F02D 41/30 701/104 |
| 2013/0325296 | A1* | 12/2013 | Koshi | F02D 41/0085 701/104 |
| 2014/0095053 | A1* | 4/2014 | Oda | F02D 41/0082 701/104 |

FOREIGN PATENT DOCUMENTS

| | | |
|---|---|---|
| JP | 2001-082221 A | 3/2001 |
| JP | 2004-124793 A | 4/2004 |
| JP | 2004-232487 A | 8/2004 |
| JP | 2006-063821 A | 3/2006 |
| JP | 2008-101546 A | 5/2008 |
| JP | 2008-223620 A | 9/2008 |
| JP | 2010-043543 A | 2/2010 |
| JP | 2010-168905 A | 8/2010 |

* cited by examiner

CONTROL DEVICE FOR INTERNAL COMBUSTION ENGINE

TECHNICAL FIELD

The present invention relates to a control device for an internal combustion engine and particularly to a control device for an internal combustion engine that is suitable for controlling an internal combustion engine including a fuel injection valve for each of plural intake ports provided in a same cylinder.

BACKGROUND ART

Conventionally, for example, Patent Document 1 discloses an air-fuel ratio learning control device for an internal combustion engine that includes a fuel injection valve for each of two intake ports provided in each cylinder. In order to separately learn and correct deviations of injection characteristics of the two fuel injection valves in the each cylinder, this conventional control device executes following control. More specifically, the two fuel injection valves in the each cylinder are arranged to be temporarily driven one after another, and, based on air-fuel ratio feedback correction amounts before and after the other injection valve stops injection, the deviation of the injection characteristic of the each fuel injection valve in the cylinder to be learned is learned independently by using output of an air-fuel ratio sensor disposed in an exhaust passage.

As in the internal combustion engine described in Patent Document 1, in the internal combustion engine that includes the fuel injection valve for each of the plural intake ports provided independent of each other in each cylinder, an amount of fuel that flows together with air from the each intake port into the cylinder can vary in each cycle due to factors such as adhesion of the fuel to the each intake port or the like and the deviation in the injection characteristic of the each fuel injection valve. However, in a method described in Patent Document 1, if the plural (two, for example) fuel injection valves in the each cylinder are simultaneously driven, it is impossible to detect the variation in the amount of the fuel for the each intake port per cycle that is injected by the each fuel injection valve and flows from the each intake port into the cylinder. In addition, as in the method described in Patent Document 1, if the fuel is injected only from one of the fuel injection valves to learn the deviation in the injection characteristic thereof, it is concerned that the fuel supplied to the cylinder becomes unbalanced (becomes inconsistent) and that fuel economy and exhaust emission (THC, CO, and the like) may be worsened.

In addition to the above document, the applicant recognizes the following documents to be related to the present invention.

PRIOR ART DOCUMENTS

Patent Documents

Patent Document 1: Japanese Patent Application Publication No. 2010-168905 (JP 2010-168905 A)
Patent Document 2: Japanese Patent Application Publication No. 2004-124793 (JP 2004-124793 A)
Patent Document 3: Japanese Patent Application Publication No. 2001-82221 (JP 2001-82221 A)
Patent Document 4: Japanese Patent Application Publication No. 2010-43543 (JP 2010-43543 A)
Patent Document 5: Japanese Patent Application Publication No. 2004-232487 (JP 2004-232487 A)
Patent Document 6: Japanese Patent Application Publication No. 2000-291436 (JP 2000-291436 A)
Patent Document 7: Japanese Patent Application Publication No. 11-50900 (JP 11-50900 A)
Patent Document 8: Japanese Patent Application Publication No. 2006-63821 (JP 2006-63821 A)

SUMMARY OF THE INVENTION

The present invention has been made to solve a problem such as above and therefore has an object to provide a control device for an internal combustion engine that can correct variation in an amount of fuel that flows from each intake port into a cylinder for the each intake port per cycle in the internal combustion engine including a fuel injection valve for each of the plural intake ports provided independent of each other in the same cylinder.

The present invention is the control device for the internal combustion engine that includes plural intake ports, plural intake valves, plural fuel injection valves, plural exhaust valves, plural exhaust ports, an exhaust air-fuel ratio obtaining means, and a fuel injection control means.

The plural intake ports are provided in a same cylinder and are independent of each other. The plural intake valves respectively open and close the plural intake ports. The plural fuel injection valves are respectively provided for the plural intake ports and can respectively inject fuel toward the plural intake ports. The plural exhaust valves are respectively disposed near the plural intake valves. The plural exhaust ports are respectively opened and closed by the plural exhaust valves. The exhaust air-fuel ratio obtaining means separately obtains air-fuel ratios of exhaust gas discharged from the plural exhaust ports. Based on the air-fuel ratios of the exhaust gas from the plural exhaust ports that are separately obtained by the exhaust air-fuel ratio obtaining means, the fuel injection control means controls fuel injection amounts that are injected in a next cycle toward the intake ports near the exhaust ports that correspond to the air-fuel ratios of the exhaust gas separately obtained by the exhaust air-fuel ratio obtaining means such that each of the air-fuel ratios of the exhaust gas from the plural exhaust ports corresponds to target air-fuel ratio in the next cycle.

In the present invention, the plural exhaust valves are respectively disposed near the plural intake valves. The gas that flows through the each exhaust valve and is discharged to the each exhaust port mainly contains gas around the exhaust valve immediately after the exhaust valve is opened, that is, gas that flows into a cylinder from the intake port corresponding to the intake valve near the exhaust valve and is then combusted. Accordingly, it is possible to obtain the air-fuel ratio of the gas that flows into the cylinder from the intake port corresponding to the each exhaust port by separately obtaining the air-fuel ratio of the exhaust gas discharged from the each exhaust port by the exhaust air-fuel ratio obtaining means. According to the above control of the fuel injection control means, the fuel injection amount that is injected in the next cycle toward the intake port corresponding to the each air-fuel ratio is controlled in consideration of the thus-obtained each air-fuel ratio of the gas flowing from the each intake port into the cylinder. Therefore, according to the present invention, it is possible to correct the variation in the fuel amount that flows from the each intake port into the cylinder for the each intake port per cycle.

The plural intake ports in the present invention may be first and second intake ports. The plural intake valves may be first and second intake valves that respectively open and close the first and second intake ports. The plural fuel injection valves may be first and second fuel injection valves that are respectively provided for the first and second intake ports. The plural exhaust valves may be a first exhaust valve that is disposed near the first intake valve and a second exhaust valve that is disposed near the second intake valve. The plural exhaust ports may be first and second exhaust ports that are respectively opened and closed by the first and second exhaust valves. The exhaust air-fuel ratio obtaining means may be a means for separately obtaining first and second air-fuel ratios of the exhaust gas discharged from the first and second exhaust ports. When at least one of the obtained first and second air-fuel ratios is leaner than the target air-fuel ratio, the fuel injection control means may reduce the fuel injection amount in the next cycle by at least one of the first and second fuel injection valves, which corresponds to at least lean one of the first and second air-fuel ratios.

Accordingly, in consideration of fluctuation in the fuel amount that is adhered to the each intake port per cycle, it is possible to prevent locally rich distribution of the air-fuel mixture in the cylinder in the next cycle. Therefore, it is possible to reduce NOx emission.

The internal combustion engine in the present invention may further include an exhaust valve mechanism that is set such that opening timing of the second exhaust valve is delayed from opening timing of the first exhaust valve in the same cylinder or that can relatively change the opening timing of each of the first and second exhaust valves during an operation of the internal combustion engine such that the opening timing of the second exhaust valve is delayed from the opening timing of the first exhaust valve in the same cylinder. The exhaust air-fuel ratio obtaining means may include an air-fuel ratio sensor that detects air-fuel ratio of the exhaust gas flowing through a merged exhaust passage after the exhaust gas from the first exhaust port and the exhaust gas from the second exhaust port are merged. The exhaust air-fuel ratio obtaining means may obtain the air-fuel ratio of the exhaust gas that is detected by the air-fuel ratio sensor at timing that the exhaust gas discharged to the first exhaust port reaches the air-fuel ratio sensor in a period when only the first exhaust valve is opened as the first air-fuel ratio, and may obtain the air-fuel ratio of the exhaust gas that is detected by the air-fuel ratio sensor at timing that the exhaust gas discharged to the second exhaust port reaches the air-fuel ratio sensor in a period when the second exhaust valve is later opened in the exhaust stroke as the second air-fuel ratio.

Accordingly, the timing at which the exhaust gas flowing through the first exhaust port is discharged is changed from the timing at which the exhaust gas flowing through the second port is discharged by changing the opening timing of the first exhaust valve from the opening timing of the second exhaust valve; therefore, it is possible with the single air-fuel ratio sensor to separately obtain the first and second air-fuel ratios that respectively indicate the air-fuel ratios of the gas flowing from the first and second intake ports into the cylinder.

In addition, the internal combustion engine in the present invention may further includes: an exhaust valve mechanism that is set such that the first exhaust valve is opened before the second exhaust valve is opened and then the second exhaust valve is opened at the same time as closing timing of the first exhaust valve or in a specified period before and after the closing timing of the first exhaust valve in the same cylinder or that can change opening characteristics of the first and second exhaust valves during the operation of the internal combustion engine such that the first exhaust valve is opened before the second exhaust valve is opened and then the second exhaust valve is opened at the same time as the closing timing of the first exhaust valve or in the specified period near the closing timing of the first exhaust valve in the same cylinder; and an ignition system for igniting the air-fuel mixture in the cylinder. The exhaust air-fuel ratio obtaining means may include the air-fuel ratio sensor that detects the air-fuel ratio of the exhaust gas flowing through the merged exhaust passage after the exhaust gas from the first exhaust port and the exhaust gas from the second exhaust port are merged. The exhaust air-fuel ratio obtaining means may be a means for obtaining the air-fuel ratio of the exhaust gas that is detected by the air-fuel ratio sensor at timing that the exhaust gas discharged to the second exhaust port reaches the air-fuel ratio sensor in a period when only the second exhaust valve is opened as the second air-fuel ratio. The control device for the internal combustion engine may further include an ignition timing control means that advances ignition timing in the next cycle when the second air-fuel ratio obtained by the exhaust air-fuel ratio obtaining means is richer than a specified determination value.

Accordingly, the exhaust air-fuel ratio obtaining means is used to obtain the second air-fuel ratio as a value that favorably indicates air-fuel ratio of residual gas in the cylinder. Then, when the second air-fuel ratio is rich and it is thus possible to determine that concentration of $CO_2$ in the residual gas is high, the ignition timing in the next cycle is advanced; therefore, it is possible to prevent an increase of combustion fluctuation in the next cycle that is caused by the high concentration of $CO_2$ in the residual gas.

Furthermore, the internal combustion engine in the present invention may further includes: the exhaust valve mechanism that is set such that the first exhaust valve is opened before the second exhaust valve is opened and then the second exhaust valve is opened at the same time as the closing timing of the first exhaust valve or in the specified period before and after the closing timing of the first exhaust valve in the same cylinder or that can change the opening characteristics of the first and second exhaust valves during the operation of the internal combustion engine such that the first exhaust valve is opened before the second exhaust valve is opened and then the second exhaust valve is opened at the same time as the closing timing of the first exhaust valve or in the specified period near the closing timing of the first exhaust valve in the same cylinder; and the ignition system for igniting the air-fuel mixture in the cylinder. The exhaust air-fuel ratio obtaining means may include the air-fuel ratio sensor that detects the air-fuel ratio of the exhaust gas flowing through the merged exhaust passage after the exhaust gas from the first exhaust port and the exhaust gas from the second exhaust port are merged. The exhaust air-fuel ratio obtaining means may be a means for obtaining the air-fuel ratio of the exhaust gas that is detected by the air-fuel ratio sensor at the timing that the exhaust gas discharged to the second exhaust port reaches the air-fuel ratio sensor in the period when only the second exhaust valve is opened as the second air-fuel ratio. The control device for the internal combustion engine may further include a first ignition energy adjusting means for adjusting ignition energy that is generated by the ignition system in the next cycle according to the second air-fuel ratio that is obtained by the exhaust air-fuel ratio obtaining means.

Accordingly, the exhaust air-fuel ratio obtaining means is used to obtain the second air-fuel ratio as a value that favorably indicates the air-fuel ratio of the residual gas in the cylinder. When the second air-fuel ratio is lean, it can be determined that a misfire is likely to occur in the next cycle due to a low temperature of the residual gas. Thus, the ignition energy that is generated by the ignition system in the next cycle is adjusted according to the above second air-fuel ratio; therefore, it is possible to suppress wear of an electrode that is caused by the operation under the high ignition energy in all the cycles and is also possible to suppress a misfire that is caused by reduction in the residual gas temperature.

Moreover, the control device for the internal combustion engine in the present invention may further include: a cylinder pressure obtaining means for obtaining a cylinder pressure of the internal combustion engine; and a second ignition energy adjusting means for adjusting the ignition energy generated by the ignition system in the next cycle according to a crank angle at a time when the cylinder pressure obtained by the cylinder pressure obtaining means indicates a maximum value.

If the crank angle at the time when the cylinder pressure indicates the maximum value is advanced, the cylinder pressure is quickly lowered from an expansion stroke to an exhaust stroke. As a result, the residual (burned) gas temperature is lowered. Accordingly, when the second air-fuel ratio is lean and the crank angle is advanced, the residual gas temperature is further lowered, and a misfire is more likely to occur. Therefore, in addition to the second air-fuel ratio, by adjusting the ignition energy that is generated by the ignition system in the next cycle according to the crank angle at the time when the cylinder pressure indicates the maximum value; it is possible to suppress a misfire in a situation where a misfire that is caused by the reduction in the residual gas temperature is likely to occur.

The present invention may be configured such that a length of the second exhaust passage from the second exhaust valve to an arrangement portion of the air-fuel ratio sensor including the second exhaust port is longer than a length of the first exhaust passage from the first exhaust valve to the arrangement portion of the air-fuel ratio sensor including the first exhaust port.

Accordingly, because the length of the second exhaust passage is longer than the length of the first exhaust passage, a time required for the exhaust gas that flows through the second exhaust port after the opening of the second exhaust valve to reach the air-fuel ratio sensor can be set longer than a time required for the exhaust gas flowing through the first exhaust port after the opening of the first exhaust valve to reach the air-fuel ratio sensor. Because the time required for the exhaust gas to reach the air-fuel ratio sensor is varied between the first and second exhaust ports with such a configuration, it is possible to accurately and separately obtain the first air-fuel ratio and the second air-fuel ratio.

The internal combustion engine in the present invention may further includes an exhaust variable valve mechanism that can relatively change the opening timing of the first exhaust valve and the opening timing of the second exhaust valve in the same cylinder. The exhaust air-fuel ratio obtaining means may include the air-fuel ratio sensor that detects the air-fuel ratio of the exhaust gas flowing through the merged exhaust passage after the exhaust gas from the first exhaust port and the exhaust gas from the second exhaust port are merged. The exhaust air-fuel ratio obtaining means may be a means for obtaining the air-fuel ratio of the exhaust gas that is detected by the air-fuel ratio sensor at timing that the exhaust gas discharged to the first or second exhaust port reaches the air-fuel ratio sensor in a period when only the first or second exhaust valve of the first and second exhaust valves that is opened earlier is opened as the first or second air-fuel ratio, and for obtaining the air-fuel ratio of the exhaust gas that is detected by the air-fuel ratio sensor at timing that the exhaust gas discharged to the second or first exhaust port reaches the air-fuel ratio sensor in a period when the second or first exhaust valve that is opened later in the exhaust stroke thereafter is opened as the second or first air-fuel ratio in a case where the opening timing of the first exhaust valve and the opening timing of the second exhaust valve are relatively changed by the exhaust variable valve mechanism. The control device for the internal combustion engine may further include an exhaust valve opening timing switching control means for executing exhaust valve opening timing switching control to periodically reverse relative advancement and delay of the opening timing of the first exhaust valve and the opening timing of the second exhaust valve.

When a piston moves up in the cylinder, oil that is adhered to a cylinder wall surface is scraped up by the piston. The scraped oil contains the fuel. Thus, in a latter half of the exhaust stroke, the HC concentration in the exhaust gas that is discharged from the cylinder is increased due to scraping of the oil. Accordingly, when the exhaust valve opening timing switching control that periodically reverses relative advancement and delay of the opening timing of the first exhaust valve and the opening timing of the second exhaust valve is executed, it is possible to correct a deviation in a value of the air-fuel ratio at a time when the first exhaust valve (or the second exhaust valve) is opened later by using a value of the air-fuel ratio at a time when the first exhaust valve (or the second exhaust valve) is opened early (that is, a value that is not influenced (or less likely to be influenced) by the scraping of the oil). Therefore, it is possible to further improve accuracy in measurement of the first and second air-fuel ratios.

The control device for the internal combustion engine in the present invention may further include a fuel amount increasing means for increasing a fuel injection amount by at least one of the first and second fuel injection valves that corresponds to at least one of the first and second air-fuel ratios indicating a lean value when the exhaust valve opening timing switching control is executed by using the exhaust valve opening timing switching control means during a light load operation, and when either one of the first and second air-fuel ratios indicates the value that is leaner than a specified determination value.

During the light load operation in which the fuel amount adhered to the each intake port is relatively small, the fuel injection amount itself is small. Thus, according to the above configuration, it is possible to accurately evaluate each of the fuel injection amounts by the first and second fuel injection valves by adopting a condition whose influence to the fuel adhesion to the each intake port is small. Accordingly, it is possible to accurately correct a reduction in the fuel injection amount by each of the fuel injection valves due to deterioration by aging.

The internal combustion engine in the present invention may further include a NOx catalyst of occlusion/reduction type. The control device for the internal combustion engine may further include a rich spike control execution means for executing rich spike control in the next cycle by using at least one of the first and second fuel injection valves when an integrated value of deviations in the air-fuel ratio between the first air-fuel ratio and the second air-fuel ratio, each of which is obtained in each cycle by the exhaust air-fuel ratio obtaining means, reaches a specified determination value.

In a cycle where the variation in the adhered fuel amount between the first and second intake ports is large and thus the deviation in the air-fuel ratio between the first air-fuel ratio and the second air-fuel ratio is large, the locally rich air-fuel mixture is distributed in the cylinder; therefore, the NOx emission discharged from the cylinder is increased, and it is anticipated that a NOx storage amount in the NOx catalyst is also increased. Accordingly, when the integrated value of the deviations in the air-fuel ratio that is obtained in the each cycle reaches the specified determination value, the rich spike control is executed in the next cycle by using at least one of the first and second fuel injection valves. Thus, execution timing of the rich spike control is determined on the basis of (the integrated value of) the deviation in the air-fuel ratio that is highly correlated with the NOx storage amount Therefore, it is possible to execute the rich spike control at appropriate timing and thus to improve the fuel economy.

The control device for the internal combustion engine in the present invention may further include a cold state exhaust valve control means for controlling the exhaust variable valve mechanism such that only one of the first exhaust valve and the second exhaust valve is opened when the internal combustion engine is cold.

Accordingly, a reduction in the exhaust gas temperature that is caused by heat transfer to a wall surface of the exhaust port is suppressed by reducing a surface area of the exhaust port that is used when the engine is cold, and thus it is possible to immediately warm (activate in an early period) the air-fuel ratio sensor.

BRIEF DESCRIPTION OF THE DRAWINGS

FIG. 3 is a view for illustrating a problem that is caused by variations in an amount of fuel adhered to each intake port or the like.

MODES FOR CARRYING OUT THE INVENTION

First Embodiment

System Configuration of an Internal Combustion Engine

Figure 1:
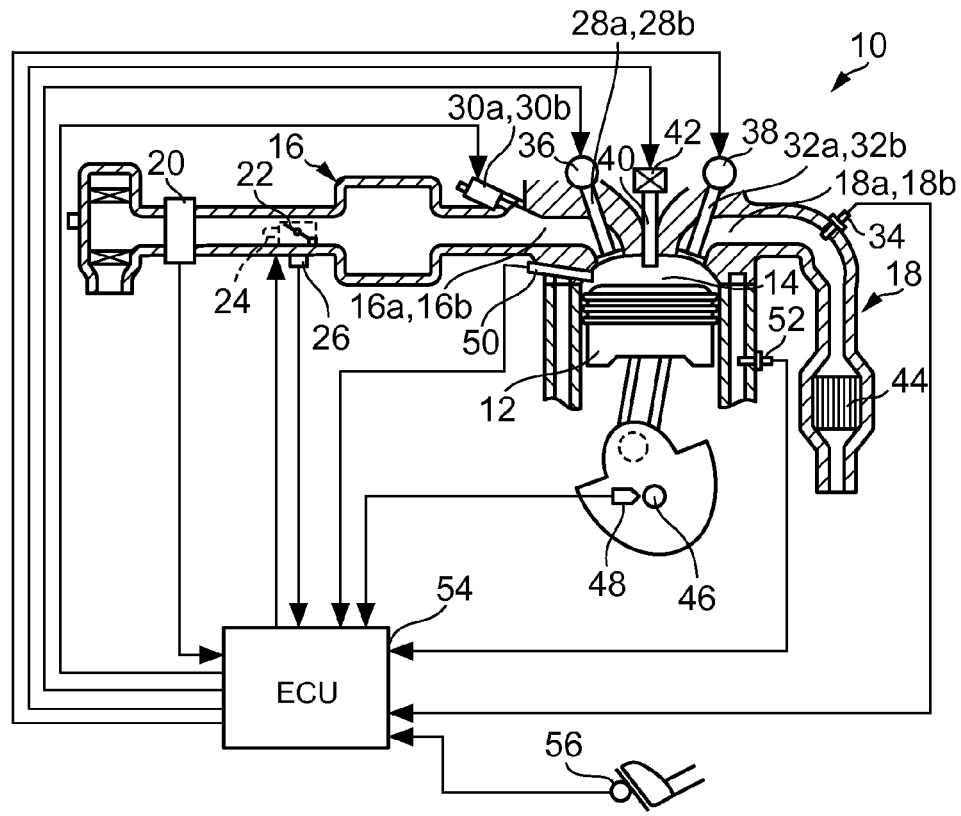
FIG. 1 is a view for illustrating a system configuration of an internal combustion engine in a first embodiment of the present invention.

FIG. 1 is a view for illustrating a system configuration of an internal combustion engine 10 in a first embodiment of the present invention. Although the number of cylinder and arrangement thereof in the internal combustion engine of the present invention is not particularly limited, the internal combustion engine 10 of this embodiment is an in-line four-cylinder engine that includes four cylinders of #1 to #4 as an example.

A piston 12 is provided in the each cylinder of the internal combustion engine 10. In the each cylinder, a combustion chamber 14 is formed on a top side of the piston 12. An intake passage 16 and an exhaust passage 18 are communicated with the combustion chamber 14. An air flow meter 20 for outputting a signal corresponding to a flow rate of air that is suctioned to the intake passage 16 is provided near an entry of the intake passage 16.

A throttle valve 22 is provided downstream of the air flow meter 20. The throttle valve 22 is an electronic control valve that is driven by a throttle motor 24. A throttle opening sensor 26 for detecting a throttle opening is disposed near the throttle valve 22.

Figure 2:
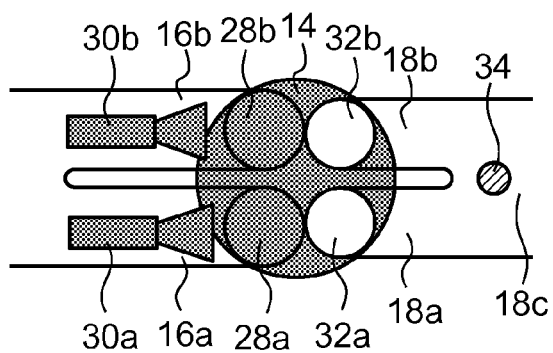
FIG. 2 is a view for illustrating a detailed configuration of a periphery of a combustion chamber of each cylinder included in the internal combustion engine shown in FIG. 1.

FIG. 2 is a view for illustrating a detailed configuration of a periphery of the combustion chamber 14 in the each cylinder that is included in the internal combustion engine 10 shown in FIG. 1.

As shown in FIG. 2, the intake passage 16 includes two intake ports, that is, a first intake port 16a and a second intake port 16b that are independent of each other for the each cylinder. The first intake port 16a and the second intake port 16b are respectively opened and closed by a first intake valve 28a and a second intake valve 28b. A first fuel injection valve 30a that can inject fuel toward the first intake port 16a is disposed near the first intake port 16a in the intake passage 16, and similarly, a second fuel injection valve 30b that can inject the fuel toward the second intake port 16b is disposed near the second intake port Mb in the intake passage 16.

In addition, as shown in FIG. 2, in the each cylinder, a first exhaust valve 32a is disposed in a position near (opposing) the first intake valve 28a, and similarly, a second exhaust valve 32b is disposed in a position near (opposing) the second intake valve 28b. The exhaust passage 18 includes first and second exhaust ports 18a, 18b that are respectively opened and closed by the first exhaust valve 32a and the second exhaust valve 32b. In a merged exhaust passage 18c after merging where exhaust gas from the first exhaust port 18a and the exhaust gas from the second exhaust port 18b are merged, an air-fuel ratio sensor 34 for detecting an air-fuel ratio of the exhaust gas in the position is disposed for the each cylinder. Although the air-fuel ratio sensor 34 is provided for the each cylinder herein, the air-fuel ratio sensor 34 may only be provided in a merged portion of an exhaust manifold (not shown) of the exhaust passage 18 that is branched toward the four cylinders included in the internal combustion engine 10.

As shown in FIG. 1, the first and second intake valves 28a, 28b of the each cylinder are driven to be opened and closed by an intake variable valve mechanism 36 while the first and second exhaust valves 32a, 32b of the each cylinder are driven to be opened and closed by the exhaust variable valve mechanism 38. More specifically, the exhaust variable valve mechanism 38 herein is a mechanism that can change each of opening timing and closing timing of the first exhaust valve 32a to any timing and that can also change each of opening timing and closing timing of the second exhaust valve 32b to any timing that is independent of each of the opening timing and closing timing of the first exhaust valve 32a, and is also a mechanism that can further switch operation states of the first exhaust valve 32a and the second exhaust valve 32b in an independent manner between a valve operating state and a closed valve stopped state. Functions of such an exhaust variable valve mechanism 38 can be achieved by using a variable valve mechanism of electromagnetic drive type.

In addition, an ignition plug 40 for igniting air-fuel mixture in the combustion chamber 14 is provided in the each cylinder. An ignition coil 42 is electrically connected to the ignition plug 40. Furthermore, in the exhaust passage 18 after the exhaust gas from the each cylinder is collected, a three-way catalyst of NOx occlusion/reduction type (hereinafter simply referred to as the "NOx catalyst") 44 is disposed to purify the exhaust gas. Moreover, a crank angle sensor 48 for detecting a rotation angle (crank angle) of a crankshaft 46 and an engine speed is disposed near the crankshaft 46 of the internal combustion engine 10. A cylinder pressure sensor 50 for detecting a cylinder pressure P is attached to the each cylinder. A water temperature sensor 52 for detecting a temperature of engine cooling water is attached to a cylinder block 10a.

A system shown in FIG. 1 includes an electronic control unit (ECU) 54. An input section of the ECU is electrically connected to various sensors for detecting an operation state of the internal combustion engine 10, such as the air flow meter 20, the throttle opening sensor 26, the air-fuel ratio sensor 34, the crank angle sensor 48, the cylinder pressure sensor 50, and the water temperature sensor 52 described above. In addition, the ECU 54 is electrically connected to an accelerator pedal operation amount sensor 56 for detecting an accelerator pedal operation amount of a vehicle in which the internal combustion engine 10 is mounted. Furthermore, an output section of the ECU 54 is electrically connected to various actuators for controlling the operation of the internal combustion engine 10 such as the throttle motor 24, fuel injection valves 30a, 30b, the variable valve mechanisms 36, 38, and the ignition coil 42 described above. Based on the output from each of the various sensors above, the ECU 54 controls an operation state of the internal combustion engine 10 by operating the various actuators in accordance with specified programs. More specifically, after the internal combustion engine 10 of this embodiment is warmed, control target air-fuel ratio is basically controlled to be specified air-fuel ratio that is leaner than theoretical air-fuel ratio, and the lean combustion operation is thereby carried out.

[Control in the First Embodiment]
(Regarding a Presupposed Problem)

Figure 3:
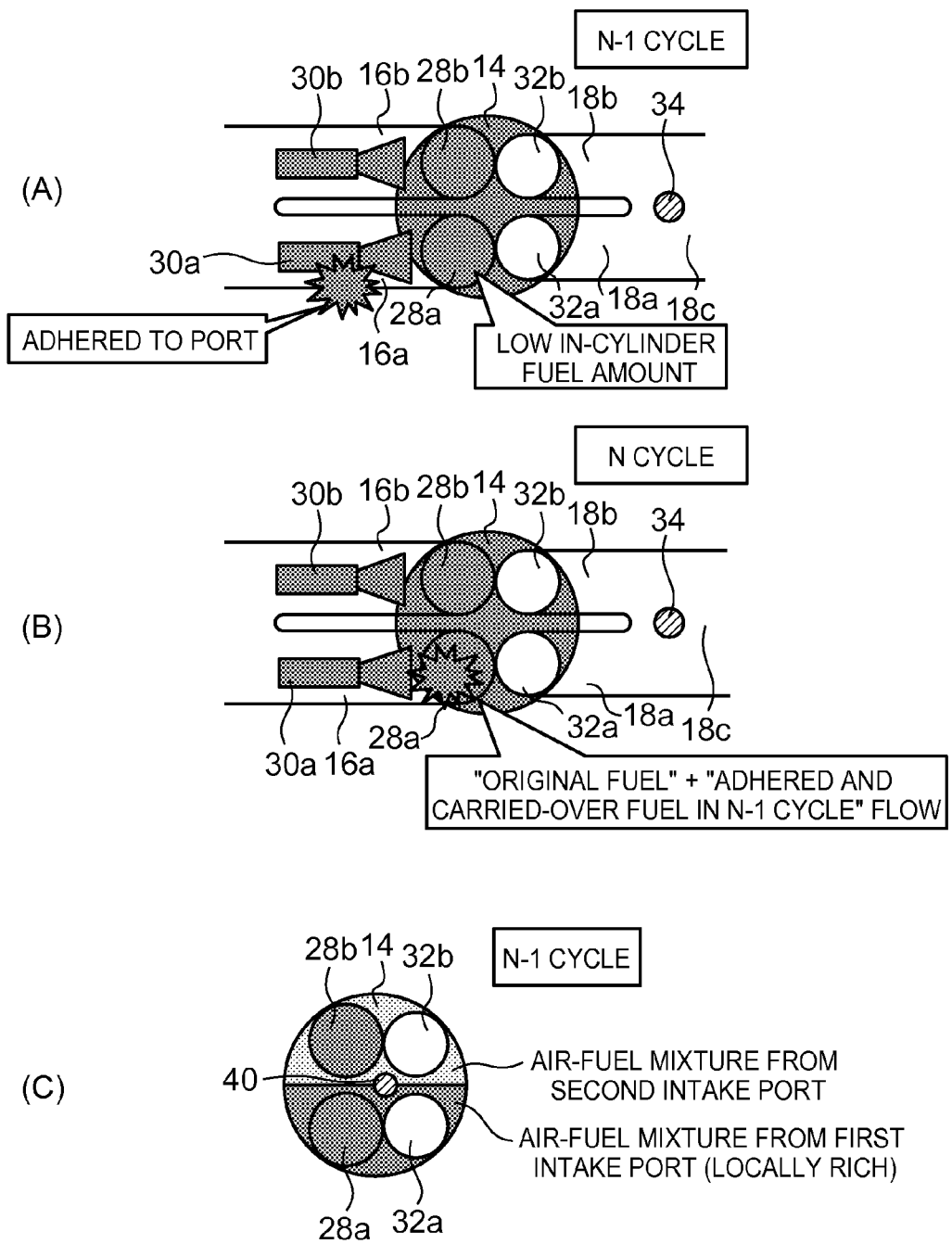

FIG. 3 is a view for illustrating a problem that is caused by variations in an amount of the fuel adhered to each of the intake ports 16a, 16b or the like. FIG. 3C is a view for conceptually showing distribution of the air-fuel mixture that is suctioned from each of the intake ports 16a, 16b into the cylinder during an intake stroke.

In the internal combustion engine of port injection type, the injected fuel is partially adhered to the intake port or the intake valve, and thus the amount of the fuel flowing into the cylinder (into the combustion chamber 14) may vary. For example, of the injected fuel, if the amount of the fuel that is adhered to the intake port or the like is increased, the amount of the fuel whose flow into the cylinder is carried over to a next cycle is increased. In the internal combustion engine of the port injection type, as a measure against such a variation in the amount of the adhered fuel in each cycle, a process of correcting the fuel injection amount is generally carried out in consideration of the behavior of the fuel injected toward the intake port (phenomena of adhesion of the part of the injected fuel to an inner wall of the intake port or the like and of evaporation of the adhered fuel).

In the internal combustion engine 10 of this embodiment, the first and second intake ports 16a, 16b respectively include the first and second fuel injection valves 30a, 30b. When such a configuration is adopted, the amount of the fuel that is adhered to each of the intake ports 16a, 16b (including adhesion to each of the intake valves 28a, 28b) may vary by the intake port. For example, as shown in FIG. 3A, if the amount of the fuel adhered to the first intake port 16a is increased in an N−1 cycle, the amount of the fuel flowing from the first intake port 16a into the cylinder in the N−1 cycle is reduced. Thus, the amount of the fuel flowing from the first intake port 16a into the cylinder in a next N cycle becomes a sum of the fuel amount that is originally planned to achieve the target air-fuel ratio and the amount of the adhered fuel whose flow into the cylinder is carried over in the N−1 cycle. Accordingly, in the N cycle, the air-fuel ratio of the air-fuel mixture that flows from the first intake port 16a into the cylinder becomes richer than the air-fuel ratio of the air-fuel mixture that flows from the other second intake port 16b into the cylinder.

The internal combustion engine 10 of this embodiment does not adopt a configuration (a shape of the intake port or the like) that intends to generate a swirl flow in the cylinder during the intake stroke. Accordingly, the air-fuel mixture that is suctioned from the first intake port 16a into the cylinder during the intake stroke is basically distributed to the cylinder in a disproportional manner in a portion near the first intake port 16a as the center while the air-fuel mixture that is suctioned from the second intake port 16b into the cylinder during the intake stroke is basically distributed to the cylinder in a disproportional manner in a portion near the second intake port 16b as the center. As a result, when a circumstance shown in FIGS. 3A, 3B occurs, the distribution of the air-fuel mixture that flows from the first intake port 16a into the cylinder in the N cycle corresponds to the distribution of the air-fuel mixture that is locally rich as shown in FIG. 3C in an understandable manner.

A NOx generation amount by combustion is highly correlated with a combustion temperature, and the combustion temperature is correlated with the air-fuel ratio of the air-fuel mixture to be combusted. Thus, in a case where the air-fuel mixture is distributed to be locally rich in the cylinder by the above phenomenon shown in FIG. 3 during the lean combustion operation, as the air-fuel ratio of the distributed air-fuel mixture becomes rich, the combustion temperature is locally increased. As a result, the NOx emission is increased.

In addition, in the N−1 cycle of the case shown in FIG. 3 above, the distribution of the air-fuel mixture that flows from the first intake port 16a into the cylinder corresponds to the distribution of the air-fuel mixture that is locally leaner than the distribution thereof that is originally intended. Then, it is estimated that the air-fuel mixture near the ignition plug 40 becomes locally lean due to the influence of such distribution of the air-fuel mixture. If prevention of a misfire is taken into account in a case where the air-fuel mixture near the ignition plug 40 becomes locally lean due to the variation in the amount of the fuel adhered to each of the intake ports 16a, 16b, the overall control air-fuel ratio in the cylinder during the lean combustion operation needs a margin to prevent the misfire. Accordingly, it is difficult to make the control air-fuel ratio substantially lean. In other words, when suppression of the misfire that can be caused by the variation in the amount of the fuel adhered to each of the intake ports 16a, 16b is concerned, there is a limitation in making the control air-fuel ratio lean, and this further increases the NOx generation amount.

The locally rich distribution of the air-fuel mixture in the cylinder and the locally lean air-fuel mixture near the ignition plug 40 can be generated by either one of the first and second intake ports 16a, 16b when a mode of the fuel adhesion to each of the intake ports 16a, 16b varies by cycle.

(Specific Contents of the Control in the First Embodiment)

Figure 4:
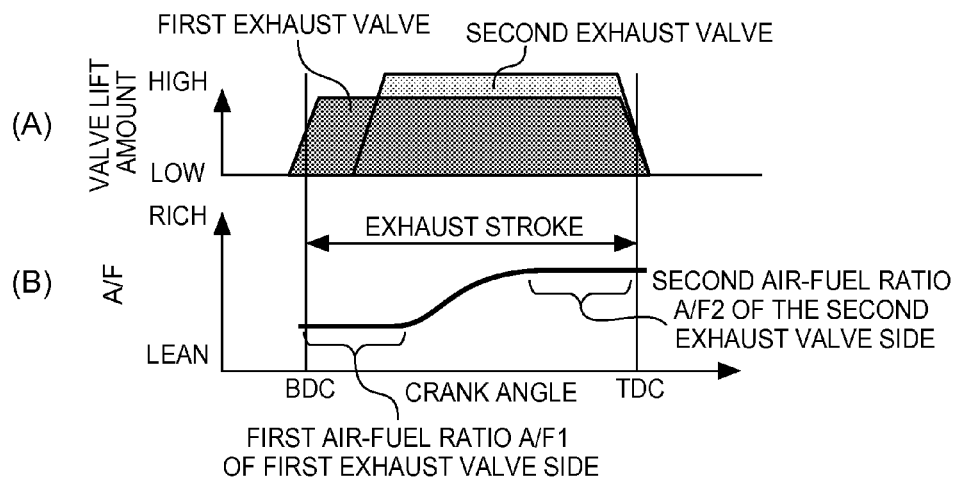
FIG. 4 is a view for illustrating control in a first embodiment of the present invention when a lean combustion operation is performed in the warm engine.

FIG. 4 is a graph for illustrating control in the first embodiment of the present invention in a case where the lean combustion operation is performed when the engine is warm.

In this embodiment, when the lean combustion operation is performed while the internal combustion engine 10 has warmed and remains warm, opening characteristics of the first and second exhaust valves 32a, 32b are controlled such that valve lift curves shown in FIG. 4A can be obtained. More specifically, in order to open the first exhaust valve 32a before the second exhaust valve 32b, the control is executed by using the exhaust variable valve mechanism 38 to delay the opening timing of the second exhaust valve 32b from the opening timing of the first exhaust valve 32a. Accordingly, as shown in FIG. 4A, the first exhaust valve 32a is opened earlier for a specified time than expansion stroke bottom dead center (BDC), and the second exhaust valve 32b is opened after a lapse of a specified time since the opening of the first exhaust valve 32a. Both of the exhaust valves 32a, 32b are closed near intake stroke top dead center (TDC).

During opening of the first exhaust valve 32a, the exhaust gas is forcibly discharged to the first exhaust port 18a due to a blowdown action of the exhaust gas in an initial period when only the first exhaust valve 32 is opened by the control shown in FIG. 4A. The exhaust gas discharged from the first exhaust port 18a mainly contains gas around the first exhaust valve 32a, that is, gas that flows into the cylinder from the first intake port 16a on a side of the first intake valve 28a adjacent to (opposing) the first exhaust valve 32a and is combusted (hereinafter referred to as a "first intake port derived gas" for convenience). When the first intake port derived gas reaches the air-fuel ratio sensor 34, the air-fuel ratio A/F1 of the first intake port derived gas (hereinafter referred to as the "first air-fuel ratio") is detected by the air-fuel ratio sensor 34.

Meanwhile, the exhaust gas that is discharged from the second exhaust port 18b when the second exhaust valve 32b is opened after the opening of the first exhaust valve 32a mainly contains gas around the second exhaust valve 32b, that is, gas that flows into the cylinder from the second intake port 16b on the side of the second intake valve 28b adjacent to (opposing) the second exhaust valve 32b and is combusted (hereinafter referred to as "second intake port derived gas" for convenience). When the second intake port derived gas reaches the air-fuel ratio sensor 34, the air-fuel ratio A/F2 of the second intake port derived gas (hereinafter referred to as "second air-fuel ratio") is detected by the air-fuel ratio sensor 34.

In this embodiment, as shown in FIG. 4B, the air-fuel ratio of the exhaust gas that is detected by the air-fuel ratio sensor 34 in a first half of the exhaust stroke is obtained as the first air-fuel ratio A/F1 of the first intake port derived gas, and the air-fuel ratio of the exhaust gas that is detected by the air-fuel ratio sensor 34 in a latter half of the exhaust stroke is obtained as the second air-fuel ratio A/F2 of the second intake port derived gas. Then, the fuel injection amount that is injected from each of the fuel injection valves 30a, 30b for the next cycle is controlled on the basis of the obtained first and second air-fuel ratios A/F1, A/F2 such that each of the first and second air-fuel ratios A/F1, A/F2 for the next cycle corresponds to the specified target air-fuel ratio during the current lean combustion operation.

More specifically, when the obtained first air-fuel ratio A/F1 is leaner than the target air-fuel ratio, it is determined that the amount of the fuel adhered to the first intake port 16a is large in the current cycle and that, unless a measure is taken, the amount of the fuel flowing from the first intake port 16a into the cylinder is consequently increased in the next cycle. Accordingly, in this embodiment, in such a case, the fuel injection amount that is injected from the first fuel injection valve 30a for the next cycle is reduced by the adhered fuel amount that is increased in the current cycle. In addition, when the obtained second air-fuel ratio A/F2 is leaner than the target air-fuel ratio, based on the same idea, the fuel injection amount that is injected from the second fuel injection valve 30b for the next cycle is reduced by the adhered fuel amount that is increased in the current cycle.

Furthermore, in this embodiment, when the internal combustion engine 10 is not warmed completely and thus is cold (basically during a cold start), the exhaust variable valve mechanism 38 is controlled differently from the above control of the exhaust valves 32a, 32b shown in FIG. 4A such that only one of the exhaust valves (here, only the first exhaust valve 32a as an example) is opened. Then, even when the engine is cold, the first air-fuel ratio A/F1 and the second air-fuel ratio A/F2 are respectively obtained in the first half and the latter half of the exhaust stroke as in a case where the engine is warm. Then, the fuel injection amount that is injected from each of the fuel injection valves 30a, 30b for the next cycle is controlled on the basis of the obtained first and second air-fuel ratios A/F1, A/F2 such that each of the first and second air-fuel ratios A/F1, A/F2 in the next cycle corresponds to the target air-fuel ratio during the current lean combustion operation.

Figure 5:
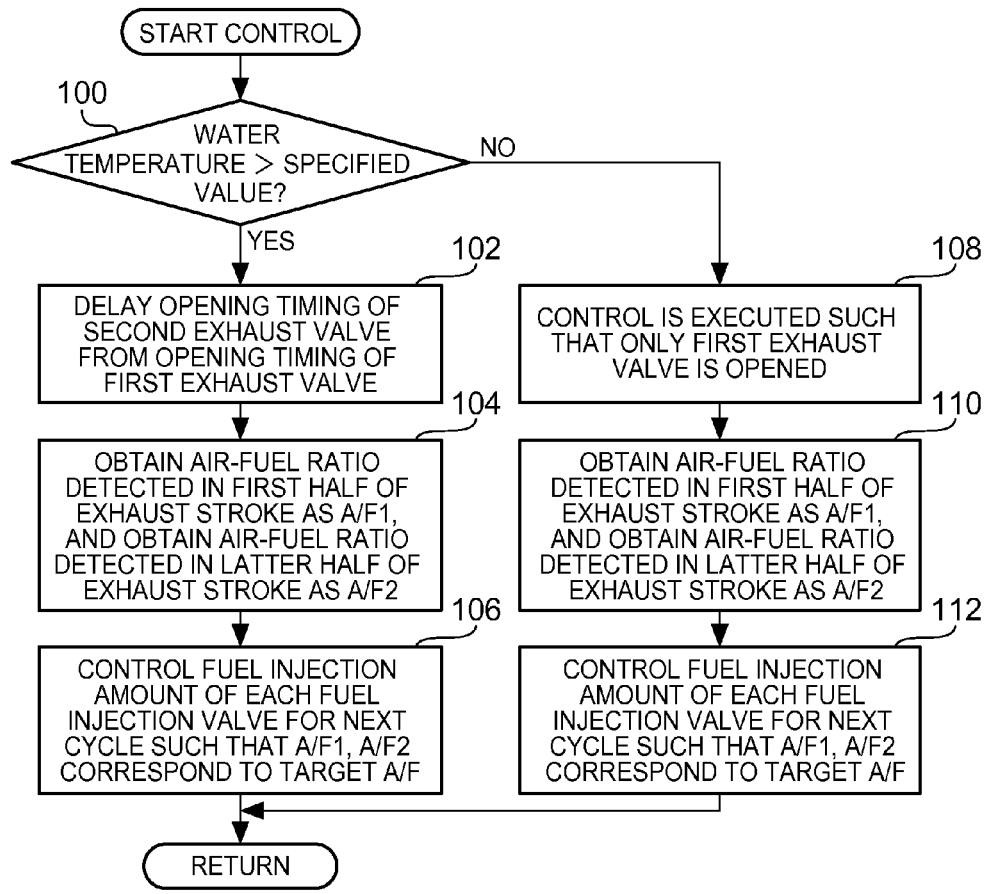
FIG. 5 is a flowchart of a routine that is executed in the first embodiment of the present invention.

FIG. 5 is a flowchart for showing a control routine that is executed by the ECU 54 to achieve the above-mentioned control of the first embodiment. This routine is repeatedly executed for each cycle in the each cylinder of the internal combustion engine 10.

In the routine shown in FIG. 5, it is first determined by using the water temperature sensor 52 whether or not the engine cooling water temperature is higher than a specified value (a step 100). The specified value in the step 100 is a value that is preset as a threshold of the engine cooling water temperature with which it is possible to determine whether or not the internal combustion engine 10 has been warmed, that is, whether the internal combustion engine 10 is warm or cold.

If the determination of the step 100 is established, that is, if it can be determined that the internal combustion engine 10 is warm, the opening characteristics of the first and second exhaust valves 32a, 32b are controlled by using the exhaust variable valve mechanism 38 such that the opening timing of the second exhaust valve 32b is delayed from the opening timing of the first exhaust valve 32a (a step 102).

Next, the air-fuel ratio of the exhaust gas that is detected by the air-fuel ratio sensor 34 at specified timing in the first half of the exhaust stroke is obtained as the first air-fuel ratio A/F1, and the air-fuel ratio of the exhaust gas that is detected by the air-fuel ratio sensor 34 at specified timing in the latter half of the exhaust stroke is obtained as the second air-fuel ratio A/F2 (a step 104). More specifically, in this step 104, the specified timing in the first half of the exhaust stroke is set according to the engine speed or the like (in consideration of a change in time required for transportation of the exhaust gas that is caused by a change in the operating state) such that the air-fuel ratio of the exhaust gas that is detected by the air-fuel ratio sensor 34 can be detected as the first air-fuel ratio A/F1 at timing that the exhaust gas discharged to the first exhaust port 18a reaches the air-fuel ratio sensor 34 in a period that only the first exhaust valve 32a is opened. Similarly, the specified timing in the latter half of the exhaust stroke is set according to the engine speed or the like such that the air-fuel ratio of the exhaust gas that is detected by the air-fuel ratio sensor 34 can be obtained as the second air-fuel ratio A/F2 at timing that the exhaust gas discharged to the second exhaust port 18b reaches the air-fuel ratio sensor 34 in a period that the second exhaust valve 32b is opened in the exhaust stroke after the first exhaust valve 32a is closed.

Then, based on the first and second air-fuel ratios A/F1, A/F2 obtained in the step 104, the fuel injection amount that is injected from each of the fuel injection valves 30a, 30b for the next cycle is controlled such that each of the first and second air-fuel ratios A/F1, A/F2 in the next cycle corresponds to the target air-fuel ratio during the current lean combustion operation (a step 106). In order to obtain the above target air-fuel ratio, the ECU 54 stores a basic fuel injection amount of each of the fuel injection valves 30a, 30b that is preset according to the operation state of the internal combustion engine 10 (determined by an intake air amount (load) and the engine speed, for example). Then, in the step 106, if necessary, the basic fuel injection amount of each of the fuel injection valves 30a, 30b is corrected on the basis of the first and second air-fuel ratios A/F1, A/F2 obtained as above such that each of the first and second air-fuel ratios A/F1, A/F2 corresponds to the target air-fuel ratio during the current the lean combustion operation. More specifically, a reduction rate or an increase rate of the fuel injection amount for the next cycle is determined as a value that is proportional to a magnitude of a deviation to the target air-fuel ratio of the obtained first and second air-fuel ratios A/F1, A/F2. For example, if the first air-fuel ratio A/F1 obtained in the step 102 is leaner than the target air-fuel ratio, the fuel injection amount is corrected by reducing the fuel injection amount that is injected from the first fuel injection valve 30a for the next cycle by a specified reduction rate so as to correct the fuel amount that corresponds to the adhered fuel amount increased in the current cycle. Meanwhile, if the second air-fuel ratio A/F2 obtained in the step 102 is leaner than the target air-fuel ratio, the fuel injection amount is corrected by reducing the fuel injection amount that is injected from the second fuel injection valve 30b for the next cycle by a specified reduction rate so as to correct the fuel amount that corresponds to the adhered fuel amount increased in the current cycle. On the contrary, if the first air-fuel ratio A/F1 or the second air-fuel ratio A/F2 obtained in the step 102 is richer than the target air-fuel ratio, the fuel injection amount is corrected by increasing the fuel injection amount that is injected from either one of the first and second fuel injection valves 30a, 30b for the next cycle by a specified increase rate so as to correct the fuel amount that corresponds to the adhered fuel amount reduced in the current cycle.

If the determination in the step 100 is not established, that is, if it can be determined that the internal combustion engine 10 is cold, the opening characteristics of the first and second exhaust valves 32a, 32b are controlled by using the exhaust variable valve mechanism 38 such that only the first exhaust valve 32a is opened (a step 108). Even when the process of this step 108 that differs from the process of the step 102 is executed, the exhaust gas that is discharged from the first exhaust port 18a mainly contains the first intake port derived gas due to the blowdown action of the exhaust gas in the initial period when only the first exhaust valve 32a is opened. Then, after the first intake port derived gas is discharged, the second intake port derived gas that is located away from the first exhaust valve 32a is discharged. Thus, even when the process of this step 108 is executed, the air-fuel ratio of the exhaust gas that is detected by the air-fuel ratio sensor 34 in the first half of the exhaust stroke can be obtained as the first air-fuel ratio A/F1 of the first intake port derived gas, and the air-fuel ratio of the exhaust gas that is detected by the air-fuel ratio sensor 34 in the latter half of the exhaust stroke can be obtained as the second air-fuel ratio A/F2 of the second intake port derived gas.

Next, based on the first and second air-fuel ratios A/F1, A/F2 obtained in the above step 108, the fuel injection amount that is injected from each of the fuel injection valves 30a, 30b for the next cycle is controlled by a process that is similar to the process in the step 106 such that each of the first and second air-fuel ratios A/F1, A/F2 for the next cycle corresponds to the target air-fuel ratio during the current lean combustion operation (a step 112).

According to the routine that is shown in FIG. 5 and is described above, the air-fuel ratios of the exhaust gas are detected in the first half and the latter half of the exhaust stroke by using the air-fuel ratio sensor 34 in the state that the first exhaust valve 32a is opened before the second exhaust valve 32b is opened (or the state that only the first exhaust valve 32a is opened); therefore, it is possible to separately detect (estimate) the air-fuel ratios of the first and second intake port derived gas as the first and second air-fuel ratios A/F1, A/F2, respectively. Then, based on the first and second air-fuel ratios A/F1, A/F2, the fuel injection amount for the next cycle can be corrected for the each intake port in consideration of the fluctuation in the adhered fuel amount to each of the intake ports 16a, 16b in the each cycle. Accordingly, regardless of the fluctuation in the adhered fuel amount between the intake ports 16a, 16b in the each cycle, variations in the air-fuel ratio of the air-fuel mixture that is supplied from each of the intake ports 16a, 16b to the cylinder can accurately be reduced. As a result, the occurrence of the local deviation in the distribution of the air-fuel mixture (to be rich or lean) in the cylinder can be suppressed.

More specifically, because the first and second air-fuel ratios A/F1, A/F2 are separately obtained in the each cycle, it is possible to detect in which of the intake ports 16a, 16b the fuel adhesion has occurred (increased). For example, if it is detected that the fuel adhesion has occurred (increased) in the first intake port 16a, the fuel injection amount for the next cycle by the first fuel injection valve 30a is corrected for reduction in consideration of the adhered fuel that is carried over to the next cycle. Accordingly, regardless of the variation of the port adhered fuel amount in the each cycle, it is possible to equalize the distribution of the air-fuel mixture (fuel distribution) in the cylinder. Because this can suppress the distribution of the air-fuel mixture in the combustion chamber 14 from becoming locally rich, it is possible to reduce the NOx emission. Furthermore, because it is possible to accurately reduce the variation in the air-fuel ratio of the air-fuel mixture that is supplied from each of the intake ports 16a, 16b to the cylinder by the control of this embodiment, the possible occurrence of a misfire that is caused by the lean air-fuel ratio is reduced; therefore, the overall control air-fuel ratio in the cylinder can be sufficiently lean during the lean combustion operation. This can also achieve the further reduction in the NOx emission during the lean combustion operation. Moreover, an increase in HC emission that is caused by unstable combustion can be prevented.

In addition, according to the above routine, when the engine is operated in the cold state, the control to open only the first exhaust valve 32a is executed as the control of the opening characteristics of the first and second exhaust valves 32a, 32b to obtain the first and second air-fuel ratios A/F1, A/F2. According to such control, the reduction in the exhaust gas temperature that is caused by the heat transfer to a wall surface of the exhaust port is suppressed by reducing a surface area of the exhaust port that is used when the engine is cold, and it is thus possible to immediately warm (activate in an early period) the air-fuel ratio sensor 34. On the other hand, when the engine is operated in the warm state, an amount of the residual gas that can be a cause of the increased combustion variation has to be reduced. Thus, different from the control just as described, the control during the operation of the warm engine, which is described above, is executed (see the step 102).

In the above-mentioned first embodiment, when the lean combustion operation is performed in the warm engine by using the exhaust variable valve mechanism 38, the opening characteristics of the first and second exhaust valves 32a, 32b are controlled such that the opening timing of the second exhaust valve 32b is delayed from the opening timing of the first exhaust valve 32a. However, the present invention is not limited to such a apparatus that has an exhaust valve mechanism of variable type that changes the opening characteristics of the first and second exhaust valves during the operation. In other words, an exhaust valve mechanism of fixed type may be used that is set in advance to delay the opening timing of the second exhaust valve from the opening timing of the first exhaust valve in the same cylinder.

In the above-described first embodiment, the first and second intake ports 16a, 16b correspond to the "plural intake ports" in the present invention, the first and second intake valves 28a, 28b correspond to the "plural intake valves" in the present invention, the first and second fuel injection valves 30a, 30b correspond to the "plural fuel injection valves" in the present invention, the first and second exhaust valves 32a, 32b correspond to the "plural exhaust valves" in the present invention, the first and second exhaust ports 18a, 18b correspond to the "plural exhaust ports" in the present invention, and the exhaust variable valve mechanism 38 corresponds to the "exhaust valve mechanism" in the present invention.

In addition, in the above-described first embodiment, an "exhaust air-fuel ratio obtaining means" in the present invention is realized when the ECU 54 executes the processes in the above steps 102 and 104 or the above steps 108 and 110, a "fuel injection control means" in the present invention is realized when the ECU 54 executes the process in the above step 106 or 112, and a "cold state exhaust valve control means" in the present invention is realized when the ECU 54 executes the process in the step 108 in a case where the determination in the above step 100 is not established.

Second Embodiment

Next, a second embodiment of the present invention will be described with reference to FIG. 6.

Figure 6:
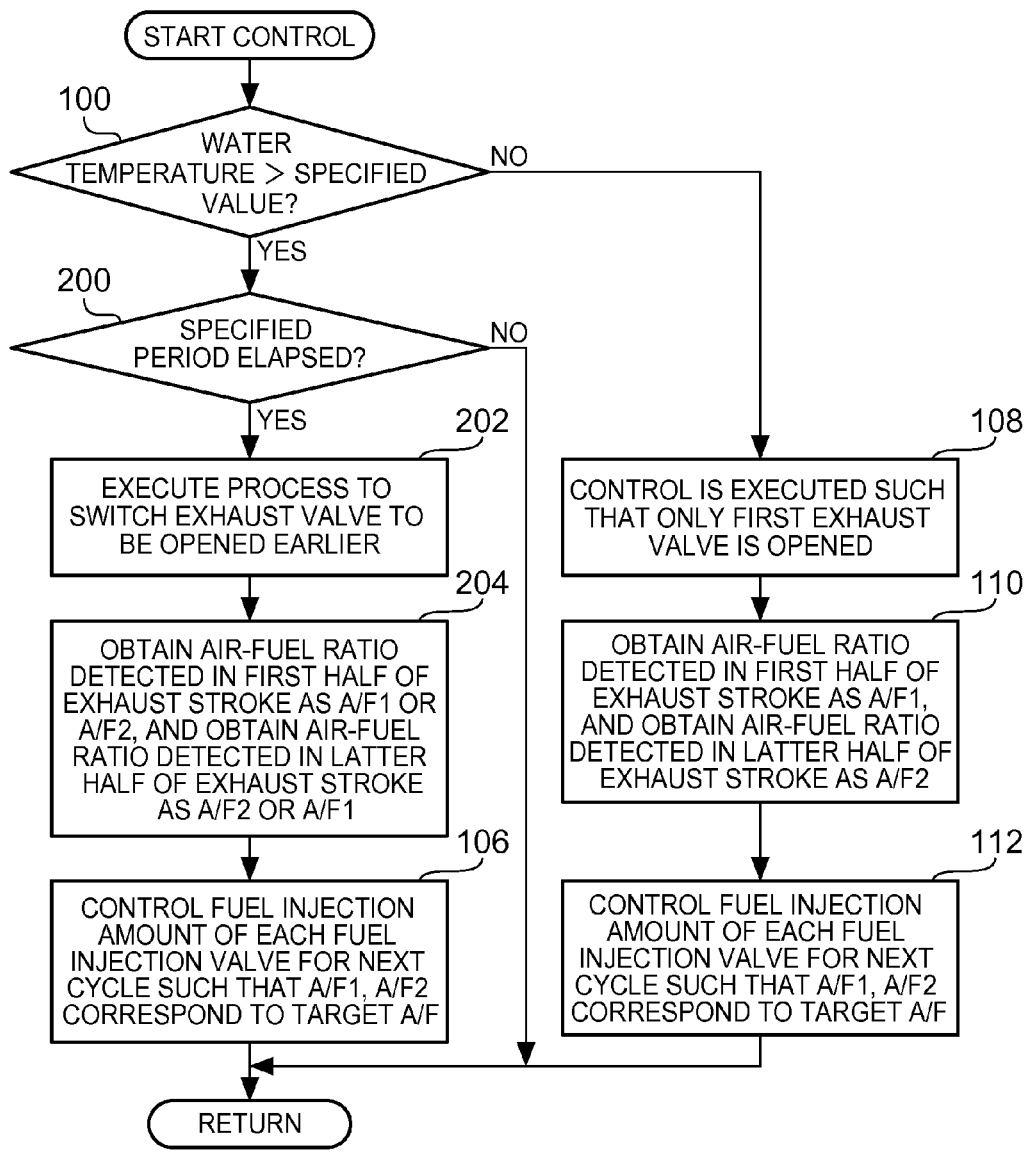
FIG. 6 is a flowchart of a routine that is executed in a second embodiment of the present invention.

A system in this embodiment can be realized by using a hardware configuration shown in FIG. 1 when the ECU 54 executes a routine that is shown in FIG. 6 and is described below instead of the routine shown in FIG. 5.

Also in the system of this embodiment, the control of the above-described first embodiment is executed. In this embodiment, the exhaust valve that is opened earlier than the other valve when the first and second air-fuel ratios A/F1, A/F2 are obtained is switched between the first exhaust valve 32a and the second exhaust valve 32b for each specified period.

FIG. 6 is a flowchart for showing a control routine executed by the ECU 54 in order to achieve the control of the second embodiment in the present invention. In FIG. 6, same steps as the steps shown in FIG. 5 in the first embodiment are denoted by the same reference numerals, and the description thereof will not be repeated or will be simplified.

In the routine shown in FIG. 6, if it is determined in the step 100 that the internal combustion engine 10 is in the warm state, it is next determined whether or not a specified period has elapsed since the exhaust valve to be opened earlier is set (switched) (a step 200). The specified period in this step 200 is a period (such as the specified number of cycles or a specified time) that is set in advance to determine timing to periodically switch the exhaust valve to be opened earlier between the exhaust valves 32a and 32b when the first and second air-fuel ratios A/F1, A/F2 are obtained.

If it is determined in the step 200 that the specified period has elapsed, a process to switch the exhaust valve to be opened earlier between the first exhaust valve 32a and the second exhaust valve 32b is executed (a step 202). It should be noted that the opening characteristics of the first and second exhaust valves 32a, 32b that serve as the basis of the process in this step 202 are set as shown in FIG. 4.

Next, by a process that is basically the same as the process in the above step 104, the first air-fuel ratio A/F1 and the second air-fuel ratio A/F2 are respectively obtained in the first half and the latter half of the exhaust stroke when the exhaust valve to be opened earlier is the first exhaust valve 32a, and the second air-fuel ratio A/F2 and the first air-fuel ratio A/F1 are respectively obtained in the first half and the latter half of the exhaust stroke when the exhaust valve to be opened earlier is the second exhaust valve 32b (a step 204).

When the piston 12 moves up in the cylinder, the oil that is adhered to the cylinder wall surface is scraped up by the piston 12. The scraped oil contains the fuel. Thus, in the latter half of the exhaust stroke, the HC concentration in the exhaust gas that is discharged from the cylinder is increased due to scraping of the oil. As a result, when the opening timing of the first exhaust valve 32a is set to be different from the opening time of the second exhaust valve 32b as in this embodiment, a value of the air-fuel ratio that is measured as either one of the first and second air-fuel ratios A/F1, A/F2 in the latter half of the exhaust stroke is deviated by the scraped oil.

In order to handle the above problem, according to the routine that is shown in FIG. 6 and is described above, the exhaust valve to be opened earlier is periodically switched between the exhaust valves 32a, 32b. Accordingly, it is possible to correct the deviation in the value of the air-fuel ratio at the time that the first exhaust valve 32a (or the second exhaust valve 32b) is opened later by using the value of the air-fuel ratio at the time when the first exhaust valve 32a (or the second exhaust valve 32b) is opened earlier (that is, the value that is not influenced (or less likely to be influenced) by the scraped oil). This can further improve accuracy in the measurement of the first and second air-fuel ratios A/F1, A/F2.

Differing from the control of this embodiment, if the specified exhaust valve 32a or 32b is set to be opened earlier, a temperature around the specified exhaust valve 32a or 32b, a periphery of which the exhaust gas at a high temperature flows through in the initial period of the exhaust stroke, is locally increased. It is thus concerned that the NOx generation amount is increased during the combustion. On the contrary, if the exhaust valve to be opened earlier is periodically switched between the exhaust valves 32a, 32b as in this embodiment, it is possible to prevent the increase in the NOx generation amount due to the above cause.

In the above-described second embodiment, an "exhaust valve opening timing switching control means" in the present invention is realized when the ECU 54 executes the processes in the steps 200 and 202.

Third Embodiment

Next, a third embodiment of the present invention will be described with reference to FIG. 7.

Figure 7:
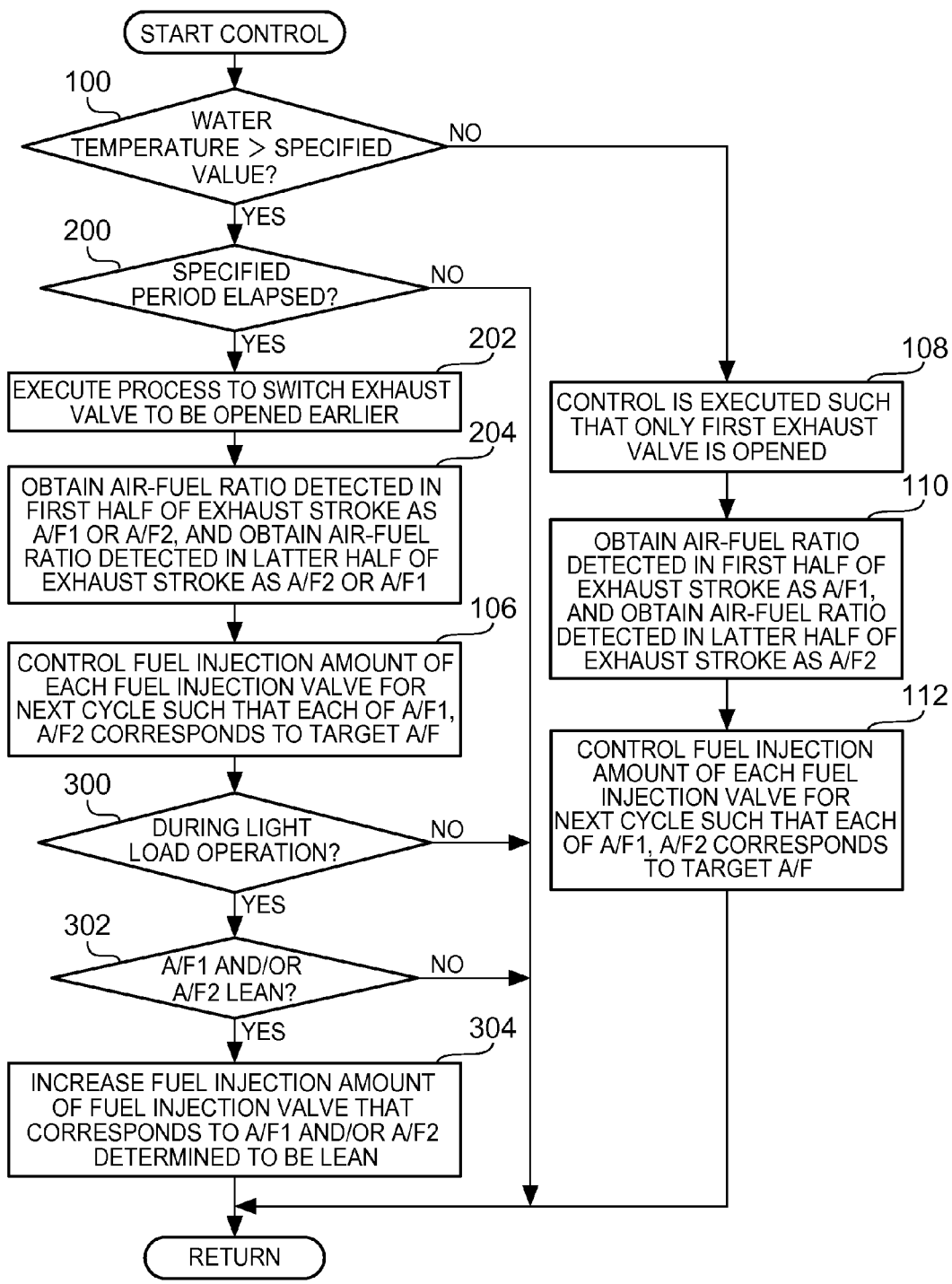
FIG. 7 is a flowchart of a routine that is executed in a third embodiment of the present invention.

A system of this embodiment can be realized by using the hardware configuration shown in FIG. 1 when the ECU 54 executes a routine that is shown in FIG. 7 and is described below instead of the routine shown in FIG. 6.

The system of this embodiment is characterized in that following control is additionally executed when the control during the operation of the warm engine in the above-described second embodiment is executed during a light load operation. In other words, in this embodiment, when at least one of the first and second air-fuel ratios A/F1, A/F2 that are obtained during the light load operation is leaner than a specified determination value, the fuel injection amount by at least one of the first and second fuel injection valves 30a, 30b that corresponds to the at least one of the first and second air-fuel ratios A/F1, A/F2 indicating the lean value is increased.

FIG. 7 is a flowchart for showing a control routine executed by the ECU 54 in order to achieve the control of the third embodiment in the present invention. In FIG. 7, same steps as the steps shown in FIG. 6 in the second embodiment are denoted by the same reference numerals, and the description thereof will not be repeated or will be simplified.

In the routine shown in FIG. 7, after the process of the above step 106 is executed, it is next determined whether or not a current operation range of the internal combustion engine 10 is a specified light load range (a step 300). A load rate that is one of indices for indicating a load state of the internal combustion engine 10 can be calculated on the basis of the intake air amount detected by the air flow meter 20 and the engine speed calculated by using the output of the crank angle sensor 48. A determination in this step 300 can be made by determining whether or not the calculated load rate is lower than a specified value, for example.

Consequently, if the determination of the step 300 is established, that is, if it can be determined be in the light load operation, it is determined whether or not at least one of the first and second air-fuel ratios A/F1, A/F2 that are obtained in the above step 204 is larger (leaner) than the specified determination value (a step 302). If the determination of this step 302 is consequently established, the fuel injection amount by at least one of the first and second fuel injection valves 30a, 30b that corresponds to the at least one of the first and second air-fuel ratios A/F1, A/F2 indicating the lean value is corrected to be increased by a specified amount (a step 304). The correction of the fuel injection amount in this step 304 is made to correct the deviation (average deviation that exists in each cycle) in an injection characteristic of the fuel injection valve 30a and/or 30b that is caused due to change by aging, which will be described below, and thus is different from the correction of the fuel injection amount for each cycle by the process of the above step 106.

The routine that is shown in FIG. 7 and is described above can produce following effects in addition to above-described effects in the second embodiment. In the fuel injection valves 30a, 30b, the fuel injection amounts that are actually injected may be smaller than commanded values due to deterioration by aging. In addition, because the fuel injection amount itself is small during the light load operation, the adhered fuel amount to the intake ports 16a, 16b are relatively small. If at least one of the first and second air-fuel ratios A/F1, A/F2 is lean even under such an operating condition, it can be determined that the fuel injection amount of each of the fuel injection valves 30a, 30b is reduced due to the deterioration by aging. As described above, according to the above routine, when the processes of the steps 302 and 304 are executed during the light load operation, it is possible to accurately evaluate the fuel injection amount by each of the fuel injection valves 30a, 30b by adopting a condition with the small influence on the fuel adhesion to the intake ports 16a, 16b. Accordingly, it is possible to accurately correct the reduction in the fuel injection amount of each of the fuel injection valves 30a, 30b due to the deterioration by aging.

In the above-described third embodiment, a "fuel amount increasing means" in the present invention is realized when the ECU 54 executes a series of the processes of the above steps 300 to 304.

Fourth Embodiment

Next, a fourth embodiment of the present invention will be described with reference to FIG. 8.

Figure 8:
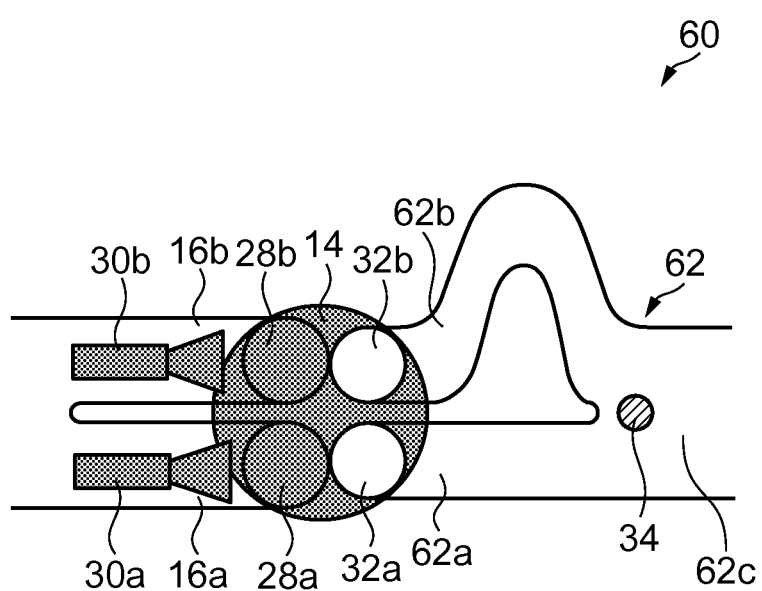
FIG. 8 is a view for illustrating a configuration of a characteristic exhaust passage in a fourth embodiment of the present invention.

FIG. 8 is a view for illustrating a configuration of a characteristic exhaust passage 62 in the fourth embodiment of the present invention. In FIG. 8, same components as those shown in FIG. 2 are denoted by the same reference numerals, and the description thereof will not be repeated or will be simplified. In addition, an internal combustion engine 60 of this embodiment is configured the same as the internal combustion engine 10 of the above-described first embodiment except for a configuration that is described below with reference to FIG. 8.

As shown in FIG. 8, the exhaust passage 62 of this embodiment is configured such that a length of a second exhaust passage from the second exhaust valve 32b to an arrangement portion of the air-fuel ratio sensor 34 including a second exhaust port 62b is longer than a length of a first exhaust passage from the first exhaust valve 32a to the arrangement portion of the air-fuel ratio sensor 34 including a first exhaust port 62a. In this embodiment, the control of the above-described first embodiment is executed. In other words, it is configured in FIG. 8 that the length of the second exhaust passage on a side of the second exhaust valve 32b that is opened after the first exhaust valve 32a when the control of the above-described first embodiment is executed is longer than the length of the other first exhaust passage. In addition, also in the configuration shown in FIG. 8, the air-fuel ratio sensor 34 is disposed in a merged exhaust passage 62c as in the configuration shown in FIG. 2.

According to the configuration of the exhaust passage 62 described above, because the length of the second exhaust passage is longer than the length of the first exhaust passage, a time required for the exhaust gas flowing through the second exhaust port 62b after the opening of the second exhaust valve 32b to reach the air-fuel ratio sensor 34 can be set longer than a time required for the exhaust gas flowing through the first exhaust port 62a after the opening of the first exhaust valve 32a to reach the air-fuel ratio sensor 34. The times for the exhaust gas to reach the air-fuel ratio sensor 34 are set differently between the exhaust ports 62a, 62b by such a configuration; therefore, when the first air-fuel ratio A/F1 and the second air-fuel ratio A/F2 are separately obtained by setting the opening timing of the first exhaust valve 32a to be different from the opening timing of the second exhaust valve 32b, the first air-fuel ratio A/F1 and the second air-fuel ratio A/F2 can accurately and separately be obtained in comparison with a case where the configuration that is shown in FIG. 2 and is described above is adopted. In addition, because the length of the first exhaust passage is set to be different from the length of the second exhaust passage, the variation in an exhaust pressure is reduced by overlapping exhaust pulsations, and thus the exhaust gas is suppressed from reciprocating in the arrangement portion of the air-fuel ratio sensor 34. This further contributes to the improvement in accuracy of obtaining the first air-fuel ratio A/F1 and the second air-fuel ratio A/F2.

In the above-described fourth embodiment, the first and second exhaust ports 62a, 62b correspond to the "plural exhaust ports" in the present invention.

Fifth Embodiment

Next, a fifth embodiment of the present invention will be described with reference to FIG. 9.

Figure 9:
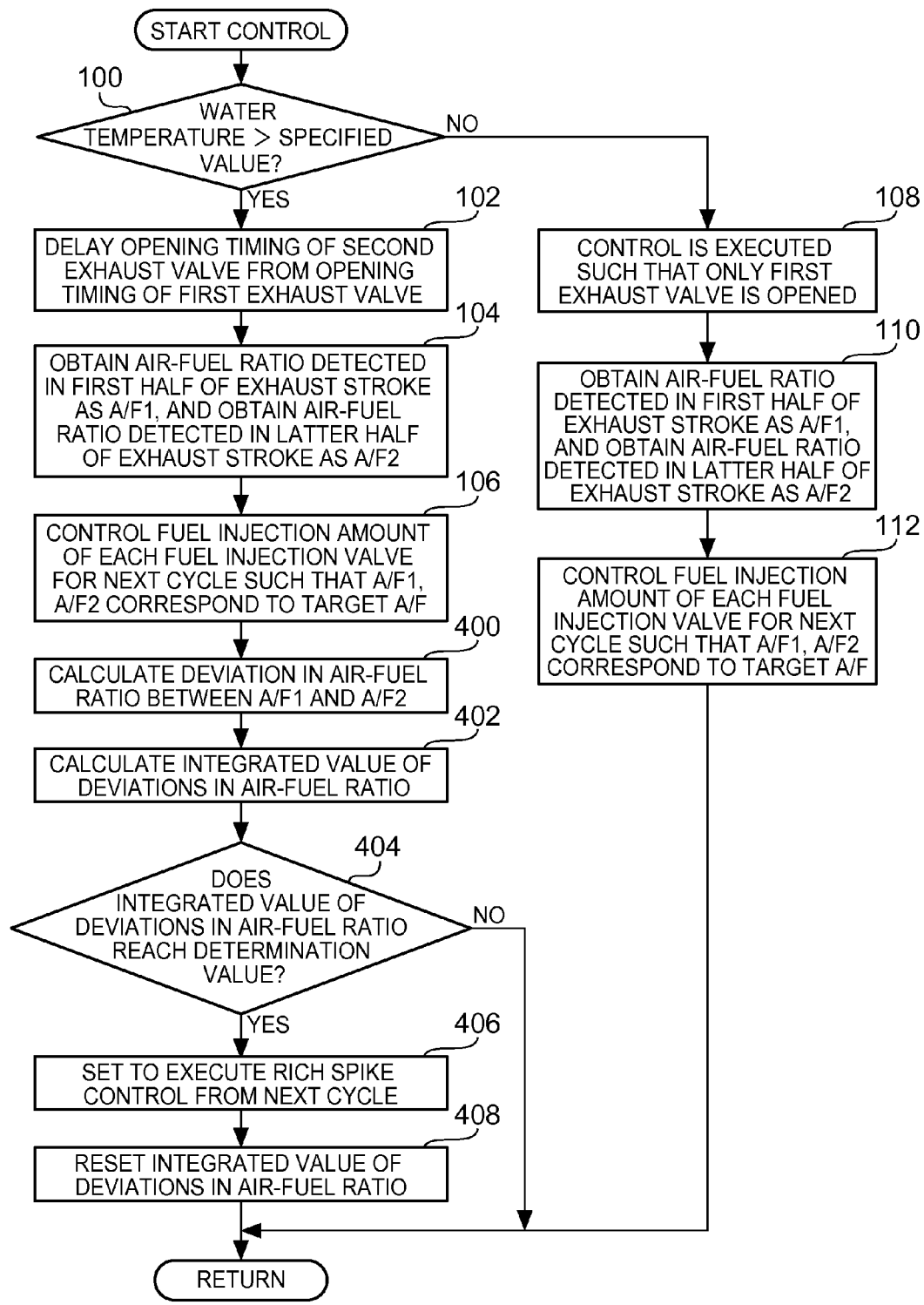
FIG. 9 is a flowchart of a routine that is executed in a fifth embodiment of the present invention.

A system of this embodiment can be realized by using the hardware configuration shown in FIG. 1 when the ECU 54 executes a routine that is shown in FIG. 9 and will be described below instead of the routine shown in FIG. 5.

Also in the system of this embodiment, the control of the above-described first embodiment is executed. Then, in this embodiment, rich spike control is executed from the next cycle for specified cycles by using the first and second fuel injection valves 30a, 30b when an integrated value of the deviation in the air-fuel ratio between the first air-fuel ratio A/F1 and the second air-fuel ratio A/F2 that is obtained in the each cycle.

FIG. 9 is a flowchart for showing a control routine that is executed by the ECU 54 in order to achieve the control of the fifth embodiment of the present invention. In FIG. 9, same steps as the steps shown in FIG. 5 in the first embodiment are denoted by the same reference numerals, and the description thereof will not be repeated or will be simplified.

In the routine shown in FIG. 9, after the process of the above step 106 is executed, the deviation in the air-fuel ratio that is a difference between the first air-fuel ratio A/F1 and the second air-fuel ratio A/F2 obtained in the current cycle is calculated (a step 400). Then, the deviation in the air-fuel ratio that is calculated in the current cycle is added to the integrated value of the deviations in the air-fuel ratio that has been calculated in a previous cycle so as to calculate the integrated value of the deviations in the air-fuel ratio in the current cycle (a step 402). The deviations in the air-fuel ratio are integrated for each cylinder in the each cycle after the most recent rich spike control is executed.

Here, when the second air-fuel ratio A/F2 is richer (smaller) than the first air-fuel ratio A/F1, the deviation in the air-fuel ratio that is the difference between the first air-fuel ratio A/F1 and the second air-fuel ratio A/F2 is a positive value. On the other hand, when the first air-fuel ratio A/F1 is richer (smaller) than the second air-fuel ratio A/F2, the deviation in the air-fuel ratio is a negative value. Thus, in the above step 402, the deviations in the air-fuel ratio are separately integrated in accordance with whether the deviation in the air-fuel ratio calculated in the each cycle is a positive value or a negative value.

Next, it is determined whether or not the integrated value of the deviations in the air-fuel ratio that is calculated in the above step 402 reaches a specified determination value (a step 404). The determination value in this step 404 is a value that is set in advance as a threshold with which it can be determined whether a NOx storage amount in the NOx catalyst 44 that is estimated on the basis of the integrated value of the deviations in the air-fuel ratio reaches an amount to execute the rich spike control. In this step 404, as for a negative integrated value among the integrated values of the deviations in the air-fuel ratio, an absolute value thereof is compared to the above determination value.

If it is determined in the above step 404 that the integrated value of the deviations in the air-fuel ratio has reached the determination value, it is set to execute the rich spike control from the next cycle for the specified cycles by using the first and second fuel injection valves 30a, 30b (a step 406). The rich spike control is control to switch the air-fuel ratio of the exhaust gas from the lean air-fuel ratio to the rich air-fuel ratio only for a short time during the lean combustion operation in order to release and reduce NOx stored in the NOx catalyst 44. The adjustment of the fuel injection amount for the rich spike control may differ from the adjustment described above and may be performed by using only one of the first and second fuel injection valves 30a, 30b. Next, the current integrated value of the deviations in the air-fuel ratio is reset (a step 408).

According to the routine that is shown in FIG. 9 and is described above, in addition to the above-described effects in the first embodiment, the rich spike control can be executed at appropriate timing as described below. More specifically, because the rich spike control leads to degradation of fuel economy, it is desired to be executed only when needed with a minimum required amount. In a cycle in which the variations in the adhered fuel amount between the intake ports 16a, 16b are large and thus the difference between the first air-fuel ratio A/F1 and the second air-fuel ratio A/F2 (above deviation in the air-fuel ratio) is large, an amount of NOx discharged from the cylinder is increased due to the locally rich distribution of the air-fuel mixture in the cylinder, and it is anticipated that the NOx storage amount to the NOx catalyst 44 is increased. Accordingly, it is possible to estimate a total NOx storage amount that is stored in the NOx catalyst 44 by integrating the deviation in the air-fuel ratio in the each cycle. In the above routine, the execution timing of the rich spike control is determined on the basis of (the integrated value of) the deviations in the air-fuel ratio that are highly correlated with the NOx storage amount as described above. Therefore, the rich spike control can be executed at the appropriate timing, and thus the fuel economy can be improved.

In addition, if the positive or negative integrated value of the deviations in the air-fuel ratio described above is large, it can be determined that the fuel injection amount of either one of the first and second fuel injection valves 30a, 30b is permanently deviated. Accordingly, if the positive integrated value of the deviations in the air-fuel ratio is large (that is, if it can be determined that the second air-fuel ratio A/F2 is permanently deviated to the rich side from the first air-fuel ratio A/F1), the correction may be made to reduce the fuel injection amount of the second fuel injection valve 30b. Furthermore, similarly, if the negative integrated value of the deviations in the air-fuel ratio is large as the absolute value (that is, if it can be determined that the first air-fuel ratio A/F1 is permanently deviated to the rich side from the second air-fuel ratio A/F2), the correction may be made to reduce the fuel injection amount of the first fuel injection valve 30a. Just as described, it is possible by applying the control of this embodiment to handle the variation in the injection characteristic of each of the fuel injection valves 30a, 30b.

In the above-described fifth embodiment, a "rich spike control execution means" in the present invention is realized when the ECU 54 executes a series of the processes of the steps 400 to 408.

Sixth Embodiment

Next, a sixth embodiment of the present invention will be described with reference to FIG. 10 and FIG. 11.

Figure 11:
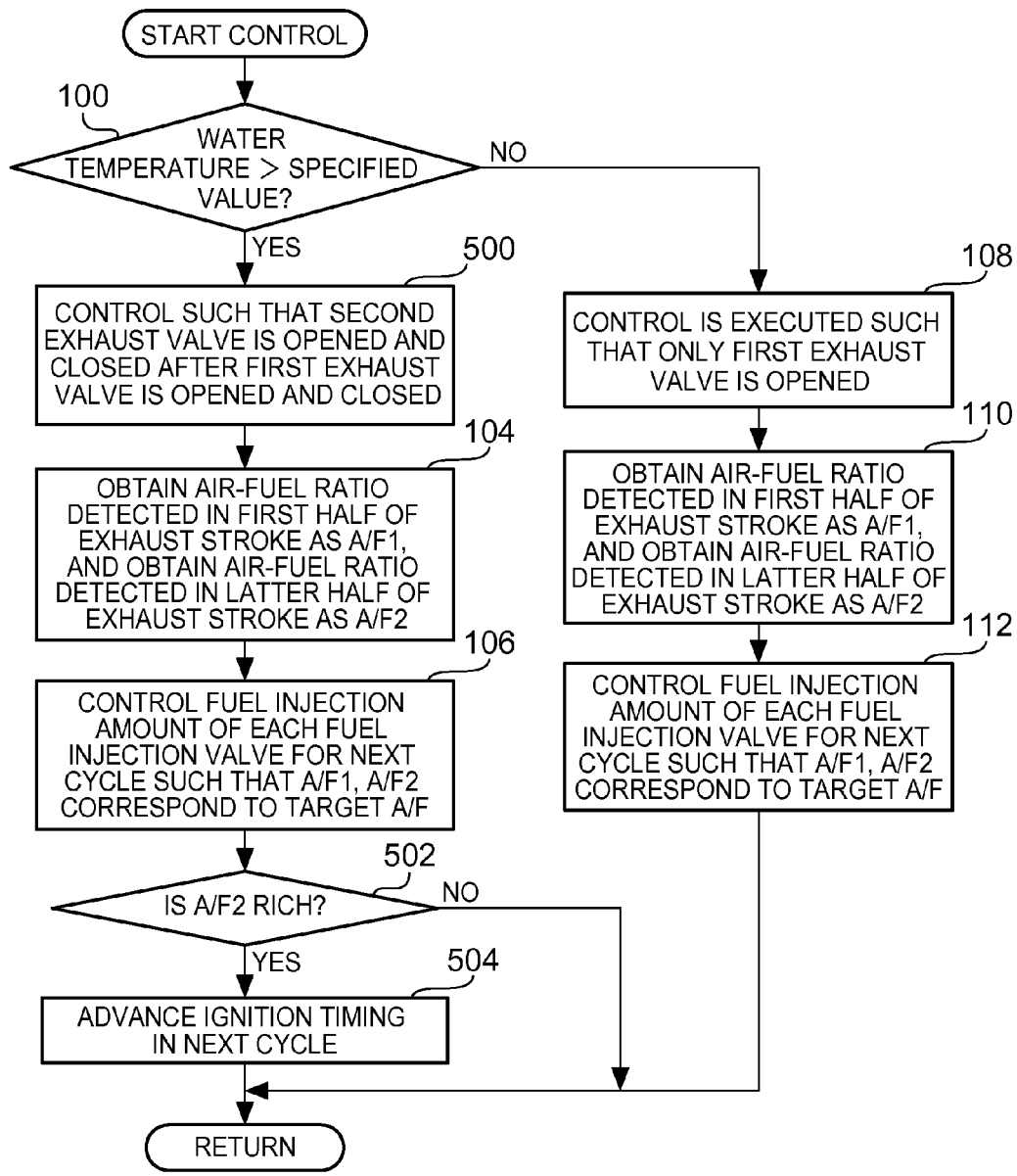
FIG. 11 is a flowchart of a routine that is executed in the sixth embodiment of the present invention.

A system of this embodiment can be realized by using the hardware configuration shown in FIG. 1 when the ECU 54 executes a routine that is shown in FIG. 11 and will be described below instead of the routine shown in FIG. 5.

Figure 10:
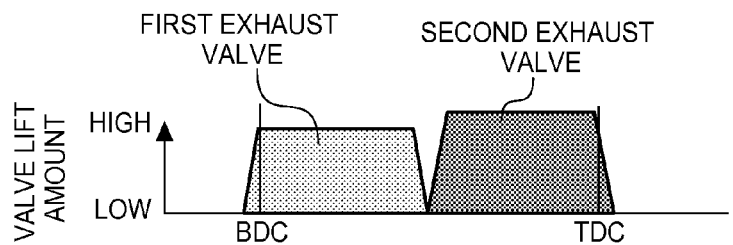
FIG. 10 is a graph for showing settings for opening characteristics of first and second exhaust valves used for control in a sixth embodiment of the present invention.

FIG. 10 is a graph for showing settings of the opening characteristics of first and second exhaust valves 32a, 32b that are used for control in the sixth embodiment of the present invention.

Also in the system of this embodiment, the control of the above-described first embodiment is executed in a mode in which the opening characteristics of the first and second exhaust valves 32a, 32b are modified as shown in FIG. 10. The valve lift curves of the first and second exhaust valves 32a, 32b shown in FIG. 10 are set such that the second exhaust valve 32b is opened and closed after the first exhaust valve 32a is opened and closed. More specifically, the first exhaust valve 32a is opened at timing that is earlier than the expansion stroke bottom dead center (BDC) by a specified period and is closed near a middle of the exhaust stroke, while the second exhaust valve 32b is opened at the same time as the closing of the first exhaust valve 32a and is closed near intake/exhaust stroke top dead center (TDC).

Even when the opening characteristics of the first and second exhaust valves 32a, 32b are set as shown in FIG. 10, the exhaust gas that is discharged from the first exhaust port 18a in the initial period in which only the first exhaust valve 32a is first opened mainly contains the first intake port derived gas due to the blowdown action of the exhaust gas. Then, after the first intake port derived gas is substantially discharged and the second exhaust valve 32b is opened at the same time as the closing of the first exhaust valve 32a, the second intake port derived gas, a substantial amount of which remains in the cylinder, is discharged. Accordingly, even the above setting is adopted, the air-fuel ratio of the exhaust gas that is detected by the air-fuel ratio sensor 34 in the first half of the exhaust stroke (more specifically, at timing that the exhaust gas discharged to the first exhaust port 18a reaches the air-fuel ratio sensor 34 in a period when only the first exhaust valve 32a is opened) can be obtained as the first air-fuel ratio A/F1. Then, the air-fuel ratio of the exhaust gas that is detected by the air-fuel ratio sensor 34 in the latter half of the exhaust stroke (more specifically, at timing that the exhaust gas discharged to the second exhaust port 18b reaches the air-fuel ratio sensor 34 in a period when only the second exhaust valve 32b is opened) can be obtained as the second air-fuel ratio A/F2.

Furthermore, in this embodiment, when the second air-fuel ratio A/F2 is richer than the specified determination value, ignition timing in the next cycle is advanced by a specified time.

FIG. 11 is a flowchart for showing a control routine executed by the ECU 54 in order to achieve the control of the sixth embodiment of the present invention. In FIG. 11, the same steps as the steps shown in FIG. 5 in the first embodiment are denoted by the same reference numerals, and the description thereof will not be repeated or will be simplified.

In the routine shown in FIG. 11, if it is determined in the above step 100 that the internal combustion engine 10 is in the warm state, the opening characteristics of the first and second exhaust valves 32a, 32b are next controlled such that the second exhaust valve 32b is opened and closed after the first exhaust valve 32a is opened and closed (a step 500). Then, the processes of the above steps 104 and 106 are executed in a state that the opening characteristics of the first and second exhaust valves 32a, 32b are controlled by the process of this step 500.

Next, it is determined whether or not the second air-fuel ratio A/F2 obtained in the above step 104 is smaller (richer) than a specified determination value (a step 502). As a result, if the determination of this step 502 is established, a process to advance the ignition timing in the next cycle is executed (a step 504).

The routine that is shown in FIG. 11 and is described above can produce the following effects in addition to the above-described effects in the first embodiment. That is, if the air-fuel ratio of the gas that remains in the cylinder as the residual gas is rich (if concentration of $CO_2$ in the gas (inert gas) is high), the combustion in the next cycle, is delayed by such a residual gas. It is possible by the processes in the above routine to determine that the air-fuel ratio of the exhaust gas that flows through the second exhaust valve 32b opened later and is discharged (the second air-fuel ratio A/F2) is same as the air-fuel ratio of the exhaust gas that remains in the cylinder. Then, according to the above routine, when such a second air-fuel ratio is richer than the specified determination value, the process to advance the ignition timing in the next cycle is executed. Accordingly, it is possible to prevent the increase in the combustion variation of the next cycle that is caused by the high concentration of $CO_2$ in the residual gas and thus is possible to improve the fuel economy.

Also, in this embodiment, the second exhaust valve 32b is opened and closed after the first exhaust valve 32a is opened and closed when the second air-fuel ratio A/F2 is obtained. According to such setting of the opening characteristics of the first and second exhaust valves 32a, 32b, because only the second exhaust valve 32b is opened in the latter half of the exhaust stroke, it can be said that the air-fuel ratio of the gas remaining in the cylinder after the closing of the second exhaust valve 32b is a value close to the second air-fuel ratio A/F2 that is the air-fuel ratio of the gas flowing through the second exhaust valve 32b and discharged to the second exhaust port 18b (the gas mainly that mainly contains the second intake port derived gas). In other words, according to the above setting, it is possible to accurately obtain the air-fuel ratio of the residual gas by using the second air-fuel ratio A/F2.

In the above-described sixth embodiment, as shown in FIG. 10, the second exhaust valve 32b is opened at the same time as when the first exhaust valve 32a that is opened first is closed. However, the present invention is not limited to the control of the opening characteristics of the exhaust valves as in the above-described aspect. That is, the second exhaust valve of the present invention may be set to be opened for a specified period before and after the closing timing of the first exhaust valve.

In addition, in the above-described sixth embodiment, when the second air-fuel ratio A/F2 is richer than the specified determination value, the ignition timing in the next cycle is advanced by the specified time. However, instead of the control described above, in the control of the ignition timing in this case, the ignition timing in the next cycle may further be advanced as the second air-fuel ratio A/F2 is rich.

In the above-described sixth embodiment, the exhaust variable valve mechanism 38 corresponds to the "exhaust valve mechanism" in the present invention, and the ignition plug 40 and the ignition coil 42 correspond to an "ignition system" in the present invention.

Furthermore, in the above-described sixth embodiment, an "ignition timing control means" in the present invention is realized when the ECU 54 executes the processes in the above steps 502 and 504.

Seventh Embodiment

Next, a seventh embodiment of the present invention will be described with reference to FIG. 12 and FIG. 13.

Figure 12:
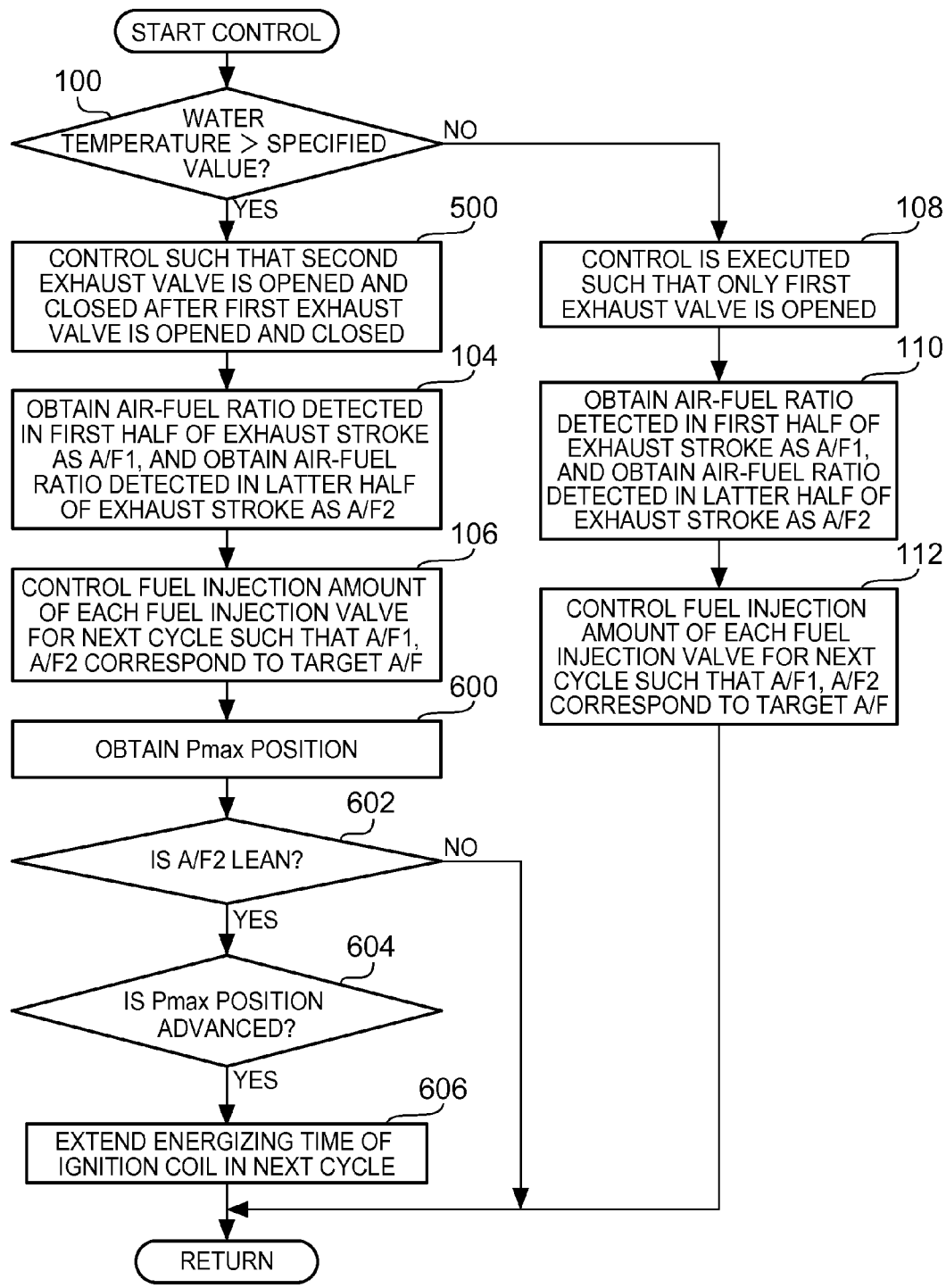
FIG. 12 is a flowchart of a routine that is executed in a seventh embodiment of the present invention.

A system of this embodiment can be realized by using the hardware configuration shown in FIG. 1 when the ECU 54 executes a routine that is shown in FIG. 12 and will be described below instead of the routine shown in FIG. 11.

Also in the system of this embodiment, similar to the above-described sixth embodiment, the control of the above-described first embodiment is executed in a mode that the opening characteristics of the first and second exhaust valves 32a, 32b are modified as shown in FIG. 10. Then, in this embodiment, if the second air-fuel ratio A/F2 is leaner than the specified determination value, and if the crank angle at the time when the cylinder pressure P indicates a maximum value Pmax (hereinafter referred to as a "Pmax position") is advanced from the specified determination value (has a value in an advanced side), ignition energy in the next cycle is increased.

FIG. 12 is a flowchart for showing a control routine executed by the ECU 54 in order to achieve the control of the seventh embodiment in the present invention. In FIG. 12, same steps as the steps shown in FIG. 11 in the sixth embodiment are denoted by the same reference numerals, and the description thereof will not be repeated or will be simplified.

In the routine shown in FIG. 12, after the process in the above step 106 is executed, the Pmax position in the current cycle is next obtained on the basis of the history of the cylinder pressure P per unit crank angle that is obtained by using the crank angle sensor 48 and a cylinder pressure sensor 50 (a step 600).

Next, it is determined whether or not the second air-fuel ratio A/F2 that is obtained in the above step 104 is larger (leaner) than the specified determination value (a step 602). As a result, if the determination of this step 602 is established, it is next determined whether or not the Pmax position that is obtained in the step 600 is advanced from the specified determination value (has a value in the advanced side) (a step 604).

If the determination of the step 604 is established, that is, if the second air-fuel ratio A/F2 is lean and the Pmax position is advanced, a process to extend an energizing time of the ignition coil 42 in the next cycle is executed in order to increase the ignition energy in the next cycle (a step 606).

The routine that is shown in FIG. 12 and is described above can produce the following effects in addition to the above-described effects in the first embodiment.

Figure 13:
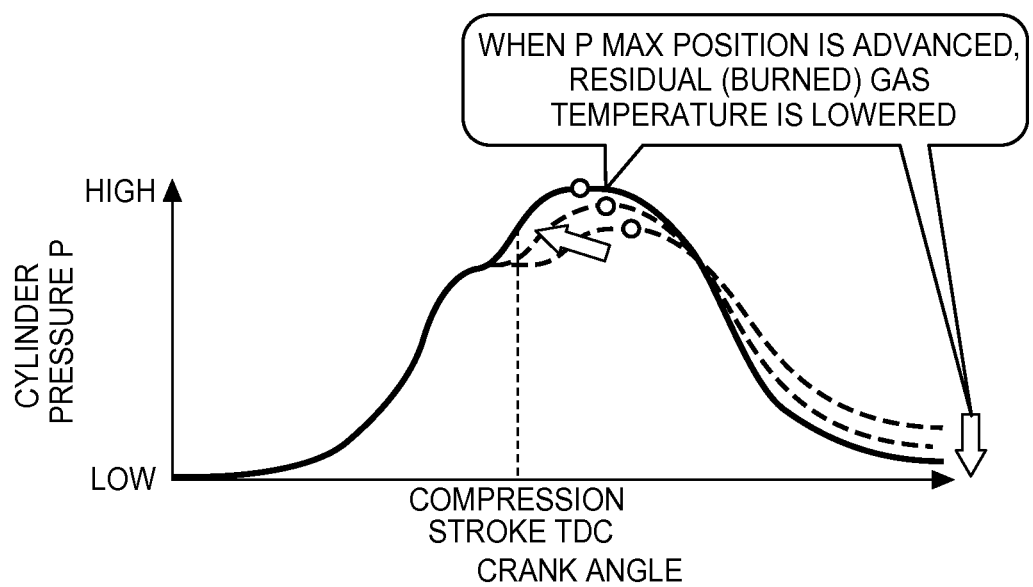
FIG. 13 is a P-θ graph for showing a relationship between a cylinder pressure P and a crank angle θ.

FIG. 13 is a P-θ graph for showing a relationship between the cylinder pressure P and a crank angle θ. As shown in FIG. 13, when the Pmax position is advanced, the cylinder pressure P is lowered early in a period from an expansion stroke to the exhaust stroke, and consequently, the residual (burned) gas temperature is lowered. In addition, when the air-fuel ratio of the combustion gas is lean, the combustion temperature is lowered, and thus the residual gas temperature is also lowered. Accordingly, when the second air-fuel ratio A/F2 is lean and the Pmax position is advanced, the residual gas temperature is further lowered. Then, when the residual gas temperature is low, the gas temperature during the combustion in the next cycle is also lowered. As a result, because a flame propagation speed is reduced, a misfire is more likely to occur.

According to the above routine, in order to handle the above problem, the process to extend the energizing time of the ignition coil 42 in the next cycle is executed to increase the ignition energy in the next cycle when the second air-fuel ratio A/F2 is lean and the Pmax position is advanced. Accordingly, because the ignition is strengthened in the cycle that a misfire is likely to occur, it is possible to effectively reduce the variations in the combustion.

In the above-described seventh embodiment, when the second air-fuel ratio A/F2 is lean and the Pmax position is advanced, the process to extend the energizing time of the ignition coil 42 in the next cycle is executed. Accordingly, because two conditions for the second air-fuel ratio A/F2 and the Pmax position are satisfied, the ignition can be strengthened in a situation where a misfire is likely to occur in the next cycle. However, the present invention is not limited to the control that is executed when the above two conditions are satisfied, but may be control that adjusts the ignition energy in the next cycle according to at least one of the second air-fuel ratio A/F2 and the Pmax position.

In addition, a method of adjusting the ignition energy in the present invention is not limited to that of adjusting the energizing time of the ignition coil 42 as described above. In other words, the two or more ignition coils are provided for each cylinder, and the number of the energized ignition coils may be increased to strengthen the ignition, for example.

Furthermore, in order to further increase the ignition energy in the next cycle, the energizing time of the ignition coil 42 in the next cycle may further be extended when the second air-fuel ratio A/F2 is leaner or the Pmax position is more advanced.

In the above-described seventh embodiment, the exhaust variable valve mechanism 38 corresponds to the "exhaust valve mechanism" in the present invention, and the ignition plug 40 and the ignition coil 42 correspond to the "ignition system" in the present invention.

In addition, in the above-described seventh embodiment, a "first ignition energy adjusting means" in the present invention is realized when the ECU 54 executes the process of the above step 606 in a situation that the determination of the above step 602 is established, and a "second ignition energy adjusting means" in the present invention is realized when the ECU 54 executes the process of the above step 606 in a situation where the determination of the above step 604 is established.

The description has been made in the first embodiment to the seventh embodiment above on the configuration in which the air-fuel ratio sensor 34 is provided in the merged exhaust passage 18c (or 62c) for each cylinder and in which the first and second air-fuel ratios A/F1, A/F2 that are the air-fuel ratios of the first and second intake port derived gas are separately obtained by controlling the opening characteristics of the exhaust valves 32a, 32b, such as by delaying the opening timing of the second exhaust valve 32b from the opening timing of the first exhaust valve 32a. However, the present invention is not limited to the invention that has the above configuration. For example, the air-fuel ratio sensor may be provided in each of the plural exhaust ports that are disposed in the same cylinder so as to separately obtain the air-fuel ratio of the gas flowing from each of the intake ports to the cylinder.

In addition, in the present invention, the air-fuel ratios of the exhaust gas discharged from the plural exhaust ports, each of which is obtained by the exhaust air-fuel ratio obtaining means, are not limited to the ratios obtained by using the air-fuel ratio sensor 34. In other words, the air-fuel ratio of the exhaust gas discharged from the cylinder is highly correlated with the combustion temperature. Thus, instead of the actual air-fuel ratio that is detected by the air-fuel ratio sensor 34, the temperature of the exhaust gas flowing through each of the exhaust ports (the actual exhaust temperature) may be detected by an exhaust temperature sensor (not shown), for example, in order to obtain each of the air-fuel ratios of the exhaust gas discharged from the plural exhaust ports.

Furthermore, the description has been made in the first embodiment to the seventh embodiment above on the configuration that includes the two fuel injection valves 30a, 30b respectively provided in the two intake ports 16a, 16b, the two exhaust valves 32a, 32b respectively disposed near the two intake valves 28a, 28b, and the two exhaust ports 18a, 18b respectively corresponding to these two exhaust valves 32a, 32b in the each cylinder of the internal combustion engine 10. However, the numbers of the intake ports, the fuel injection valves, the intake valves, the exhaust valves, and the exhaust ports in the present invention are not necessarily limited to two each but may be three or more.

DESCRIPTION OF REFERENCE NUMERALS

10, 60/INTERNAL COMBUSTION ENGINE
10a/CYLINDER BLOCK
12/PISTON
14/COMBUSTION CHAMBER
16/INTAKE PASSAGE
16a/FIRST INTAKE PORT
16b/SECOND INTAKE PORT
18, 62/EXHAUST PASSAGE
18a, 62a/FIRST EXHAUST PORT
18b, 62b/SECOND EXHAUST PORT
18c, 62c/MERGED EXHAUST PASSAGE
20/AIR FLOW METER
22/THROTTLE VALVE
24/THROTTLE MOTOR
26/THROTTLE OPENING SENSOR
28a/FIRST INTAKE VALVE
28b/FIRST INTAKE VALVE
30a/FIRST FUEL INJECTION VALVE
30b/SECOND FUEL INJECTION VALVE
32a/FIRST EXHAUST VALVE
32b/SECOND EXHAUST VALVE
34/AIR-FUEL RATIO SENSOR
36/INTAKE VARIABLE VALVE MECHANISM
38/EXHAUST VARIABLE VALVE MECHANISM
40/IGNITION PLUG
42 IGNITION COIL
44/THREE-WAY CATALYST OF OCCLUSION/REDUCTION TYPE (NOx CATALYST)
46/CRANKSHAFT
48/CRANK ANGLE SENSOR
50/CYLINDER PRESSURE SENSOR
52/WATER TEMPERATURE SENSOR
54/ECU (ELECTRONIC CONTROL UNIT)
56/ACCELERATOR PEDAL OPERATION AMOUNT SENSOR

The invention claimed is:

1. A control device for the internal combustion engine including plural intake ports that are provided in a same cylinder and are independent of each other, plural intake valves that respectively open and close the plural intake ports, plural fuel injection valves that are respectively provided for the plural intake ports and can respectively inject fuel toward the plural intake ports, plural exhaust valves that are respectively disposed near the plural intake valves, plural exhaust ports that are respectively opened and closed by the plural exhaust valves, and an exhaust air-fuel ratio obtaining unit that separately obtains air-fuel ratios of exhaust gas discharged from the plural exhaust ports during an exhaust stroke, the control device comprising:

a controller configured to control a fuel injection amount to be injected in a next cycle toward the intake port near the exhaust port that correspond to the air-fuel ratio of the exhaust gas separately obtained by the exhaust air-fuel ratio obtaining unit such that each of the air-fuel ratios of the exhaust gas from the plural exhaust ports corresponds to a specified target air-fuel ratio on the basis of each of the air-fuel ratios of the exhaust gas from the plural exhaust ports separately obtained by the exhaust air-fuel ratio obtaining unit, wherein the plural intake ports are first and second intake ports, the plural intake valves are first and second intake valves that respectively open and close the first and second intake ports the plural fuel injection valves are first and second fuel injection valves that are respectively provided for the first and second intake ports, the plural exhaust valves are a first exhaust valve that is disposed near the first intake valve and a second exhaust valve that is disposed near the second intake valve, the plural exhaust ports are first and second exhaust ports that are respectively opened and closed by the first and second exhaust valves, the exhaust air-fuel ratio obtaining unit separately obtains first and second air-fuel ratios of the exhaust gas discharged from the first and second exhaust ports during the exhaust stroke, the controller reduces the fuel injection amount in the next cycle by at least one of the first and second fuel injection valves that corresponds to at least one of the first and second air-fuel ratios that is lean when at least one of the obtained first and second air-fuel ratios is leaner than the target air-fuel ratio, wherein the internal combustion engine includes an exhaust valve mechanism that is set such that opening timing of the second exhaust valve is delayed from opening timing of the first exhaust valve in the same cylinder or that can relatively change the opening timing of the first and second exhaust valves during an operation of the internal combustion engine such that the opening timing of the second exhaust valve is delayed from the opening timing of the first exhaust valve in the same cylinder, the exhaust air-fuel ratio obtaining unit includes an air-fuel ratio sensor that detects an air-fuel ratio of the exhaust gas that flows through a merged exhaust passage after the exhaust gas from the first exhaust port and the exhaust gas from the second exhaust port merge together, and the exhaust air-fuel ratio obtaining unit obtains the air-fuel ratio of the exhaust gas that is detected by the air-fuel ratio sensor at timing when the exhaust gas discharged from the first exhaust port reaches the air-fuel sensor in a period when only the first exhaust valve is opened as the first air-fuel ratio, and obtains the air-fuel ratio of the exhaust gas that is detected by the air-fuel ratio sensor at timing when the exhaust gas discharged from the second exhaust port reaches the air-fuel ratio sensor in a period when the second exhaust valve is opened in an exhaust stroke thereafter as the second air-fuel ratio.

2. The control device for the internal combustion engine according to claim 1, wherein a length of a second exhaust passage from the second exhaust valve to an arrangement portion of the air-fuel ratio including the second exhaust port is longer than a length of a first exhaust passage from the first exhaust valve to the arrangement portion of the air-fuel ratio sensor including the first exhaust port.

3. The control device for the internal combustion engine according to claim 1, wherein the internal combustion engine further includes a NOx catalyst of occlusion/reduction type, the controller executes rich spike control in the next cycle by using at least one of the first and second fuel injection valves when an integrated value of deviation in the air-fuel ratio between the first air-fuel ratio and the second air-fuel ratio that is obtained by the exhaust air-fuel ratio obtaining unit for each cycle reaches a specified determination value.

4. The control device for the internal combustion engine according to claim 1, wherein the controller controls the exhaust variable valve mechanism such that only one of the first exhaust valve and the second exhaust valve is opened when the internal combustion engine is cold.

5. A control device for the internal combustion engine including plural intake ports that are provided in a same cylinder and are independent of each other, plural intake valves that respectively open and close the plural intake ports, plural fuel injection valves that are respectively provided for the plural intake ports and can respectively inject fuel toward the plural intake ports, plural exhaust valves that are respectively disposed near the plural intake valves, plural exhaust ports that are respectively opened and closed by the plural exhaust valves, and an exhaust air-fuel ratio obtaining unit that separately obtains air-fuel ratios of exhaust as discharged from the plural exhaust ports during an exhaust stroke, the control device comprising:

a controller configured to control a fuel injection amount to be injected in a next cycle toward the intake port near the exhaust port that correspond to the air-fuel ratio of the exhaust gas separately obtained by the exhaust air-fuel ratio obtaining unit such that each of the air-fuel ratios of the exhaust gas from the plural exhaust ports corresponds to a specific target air-fuel ratio on the basis of each of the air-fuel ratios of the exhaust gas from the plural exhaust ports separately obtained by the exhaust air-fuel ratio obtaining unit, wherein the plural intake ports are first and second intake ports, the plural intake valves are first and second intake valves that respectively open and close the first and second intake ports the plural fuel infection valves are first and second fuel injection valves that are respectively provided for the first and second intake ports, the plural exhaust valves are a first exhaust valve that is disposed near the first intake valve and a second exhaust valve that is disposed near the second intake valve, the plural exhaust ports are first and second exhaust ports that are respectively opened and closed by the first and second exhaust valves, the exhaust air-fuel ratio obtaining unit separately obtains first and second air-fuel ratios of the exhaust gas discharged from the first and second exhaust ports during the exhaust stroke, the controller reduces the fuel injection amount in the next cycle by at least one of the first and second fuel injection valves that corresponds to at least one of the first and second air-fuel ratios that is lean when at least one of the obtained first and second air-fuel ratios is leaner than the target air-fuel ratio, wherein the internal combustion engine further includes:

an exhaust valve mechanism that is set such that the first exhaust valve is opened before the second exhaust valve is opened and then the second exhaust valve is opened at the same time as closing timing of the first exhaust valve or in a period before and after the closing timing of the first exhaust valve in the same cylinder or that can change the opening characteristics of the first and second exhaust valves during an operation of the internal combustion engine such that the first exhaust valve is opened before the second exhaust valve is opened and then the second exhaust valve is opened at the same time as the closing timing of the first exhaust valve or in a specified period close to the closing timing of the first exhaust valve; and an ignition system for igniting the air-fuel mixture in the cylinder, the exhaust air-fuel ratio obtaining unit includes an air-fuel ratio sensor that detects the air-fuel ratio of the exhaust gas flowing through a merged exhaust passage after the exhaust gas from the first exhaust port and the exhaust gas from the second exhaust port are merged, the exhaust air-fuel ratio obtaining unit obtains the air-fuel ratio of the exhaust gas that is detected by the air-fuel ratio sensor at timing that the exhaust gas discharged to the second exhaust port reaches the air-fuel ratio sensor in a period when only the second exhaust valve is opened as the second air-fuel ratio, and the controller advances ignition timing in a next cycle when the second air-fuel ratio that is obtained by the exhaust air-fuel ratio obtaining unit is richer than a specified determination value.

6. A control device for the internal combustion engine including plural intake ports that are provided in a same cylinder and are independent of each other, plural intake valves that respectively open and close the plural intake ports, plural fuel injection valves that are respectively provided for the plural intake ports and can respectively inject fuel toward the plural intake ports, plural exhaust valves that are respectively disposed near the plural intake valves, plural exhaust ports that are respectively opened and closed by the plural exhaust valves, and
    an exhaust air-fuel ratio obtaining unit that separately obtains air-fuel ratios of exhaust gas discharged from the plural exhaust ports during exhaust stroke, the control device comprising:
a controller configured to control a fuel injection amount to be injected in a next cycle toward the intake port near the exhaust port that correspond to the air-fuel ratio of the exhaust gas separately obtained by the exhaust air-fuel ratio obtaining unit such that each of the air-fuel ratios of the exhaust gas from the plural exhaust ports correspond to a specified target air-fuel ratio on the basis of each of the air-fuel ratios of the exhaust gas from the plural exhaust ports separately obtained by the exhaust air-fuel ratio obtaining unit, wherein
the plural intake ports are first and second intake ports,
the plural intake valves are first and second intake valves that respectively open and close the first and second intake ports
the plural fuel injection valves are first and second fuel injection valves that are respectively provided for the first and second intake ports,
the plural exhaust valves are a first exhaust valve that is disposed near the first intake valve and a second exhaust valve that is disposed near the second intake valve,
the plural exhaust ports are first and second exhaust ports that are respectively opened and closed by the first and second exhaust valves,
the exhaust air-fuel ratio obtaining unit separately obtains first and second air-fuel ratios of the exhaust gas discharged from the first and second exhaust ports during the exhaust stroke,
the controller reduces the fuel injection amount in the next cycle by at least one of the first and second fuel injection valves that corresponds to at least one of the first and second air-fuel ratios that is lean when at least one of the obtained first and second air-fuel ratios is leaner than the target air-fuel ratio, wherein
the internal combustion engine further includes:
the exhaust valve mechanism that is set such that the first exhaust valve is opened before the second exhaust valve is opened and then the second exhaust valve is opened at the same time as the closing timing of the first exhaust valve or in a specified period before and after the closing timing of the first exhaust valve in the same cylinder, or that can change the opening characteristics of the first and second exhaust valves during the operation of the internal combustion engine such that the first exhaust valve is opened before the second exhaust valve is opened and then the second exhaust valve is opened at the same time as the closing timing of the first exhaust valve or in the specified period close to the closing timing of the first exhaust valve in the same cylinder; and the ignition system for igniting the air-fuel mixture in the cylinder,
the exhaust air-fuel ratio obtaining unit includes the air-fuel ratio sensor that detects the air-fuel ratio of the exhaust gas flowing through the merged exhaust passage after the exhaust gas from the first exhaust port and the exhaust gas from the second exhaust port are merged,
the exhaust air-fuel ratio obtaining unit obtains the air-fuel ratio of the exhaust gas that is detected by the air-fuel ratio sensor at the timing that the exhaust gas discharged to the second exhaust port reaches the air-fuel ratio sensor in the period when only the second exhaust valve is opened as the second air-fuel ratio, and
the controller adjusts ignition energy that is generated by the ignition system in the next cycle according to the second air-fuel ratio that is obtained by the exhaust air-fuel ratio obtaining unit.

7. The control device for the internal combustion engine according to claim 6, wherein
the internal combustion engine further includes a cylinder pressure obtaining unit obtains a cylinder pressure of the internal combustion engine, and
the controller adjusts the ignition energy generated by the ignition system in the next cycle according to a crank angle at which a cylinder pressure obtained by the cylinder pressure obtaining unit indicates a maximum value.

8. A control device for the internal combustion engine including plural intake ports that are provided in a same cylinder and are independent of each other, plural intake valves that respectively open and close the plural intake ports, plural fuel injection valves that are respectively provided for the plural intake ports and can respectively inject fuel toward the plural intake ports, plural exhaust valves that are respectively disposed near the plural intake valves, plural exhaust ports that are respectively opened and closed by the plural exhaust valves, and
    an exhaust air-fuel ratio obtaining unit that separately obtains air-fuel ratios of exhaust gas discharged frown the plural exhaust ports during an exhaust stroke, the control device comprising:
a controller configured to control a fuel injection amount to be injected in a next cycle toward the intake port near the exhaust port that correspond to the air-fuel ratio of the exhaust gas separately obtained by the exhaust air-fuel ratio obtaining unit such that each of the air-fuel ratios of the exhaust gas from the plural exhaust ports corresponds to a specified target air-fuel ratio on the basis of each of the air-fuel ratios of the exhaust gas from the plural exhaust ports separately obtained by the exhaust air-fuel ratio obtaining unit, wherein
the plural intake ports are first and second intake ports,
the plural intake valves are first and second intake valves that respectively open and close the first and second intake ports
the plural fuel injection valves are first and second fuel injection valves that are respectively provided for the first and second intake ports,
the plural exhaust valves are a first exhaust valve that is disposed near the first intake valve and a second exhaust valve that is disposed near the second intake valve,
the plural exhaust ports are first and second exhaust ports that are respectively opened and closed by the first and second exhaust valves, the exhaust air-fuel ratio obtaining unit separately obtains first and second air-fuel ratios of the exhaust gas discharged from the first and second exhaust ports during the exhaust stroke, the controller reduces the fuel injection amount in the next cycle by at least one of the first and second fuel injection valves that corresponds to at least one of the first and second air-fuel ratios that is lean when at least one of the obtained first and second air-fuel ratios is leaner than the target air-fuel ratio, wherein the internal combustion engine further includes the exhaust variable valve mechanism that can relatively change the opening timing of the first exhaust valve and the opening timing of the second exhaust valve in the same cylinder, the exhaust air-fuel ratio obtaining unit includes the air-fuel ratio sensor that detects the air-fuel ratio of the exhaust gas flowing through the merged exhaust passage after the exhaust gas from the first exhaust port and the exhaust gas from the second exhaust port are merged, the exhaust air-fuel ratio obtaining unit obtains the air-fuel ratio of the exhaust gas that is detected by the air-fuel ratio sensor at timing that the exhaust gas discharged to the first or second exhaust port reaches the air-fuel ratio sensor in a period when only the first or second exhaust valve of the first and second exhaust valves that is opened earlier is opened as the first or second air-fuel ratio when the opening timing of the first exhaust valve and the opening timing of the second exhaust valve are relatively changed by the exhaust variable valve mechanism, and for obtaining the air-fuel ratio of the exhaust gas that is detected by the air-fuel ratio sensor at timing that the exhaust gas discharged to the second or first exhaust port reaches the air-fuel ratio sensor in a period when the second or first exhaust valve that is opened later in the exhaust stroke is opened as the second or first air-fuel ratio, and the controller executes exhaust valve opening timing switching control to periodically reverse relative advancement and delay of the opening timing of the first exhaust valve and the opening timing of the second exhaust valve.

9. The control device for the internal combustion engine according to claim 8, wherein the controller increases a fuel injection amount by at least one of the first and second fuel injection valves that corresponds to at least one of the first and second air-fuel ratios that indicates a lean value when the exhaust valve opening timing switching control is executed during a light load operation, and when either one of the first and second air-fuel ratios indicates the value that is leaner than a specified determination value.

* * * * *